US008863992B2

(12) United States Patent
Wing et al.

(10) Patent No.: US 8,863,992 B2
(45) Date of Patent: Oct. 21, 2014

(54) METHOD AND SYSTEM FOR A BEVERAGE DISPENSING ASSEMBLY

(71) Applicant: The Delfield Company, LLC, Mount Pleasant, MI (US)

(72) Inventors: Harry Edward Wing, Midland, MI (US); Kenneth Lee Lundberg, Mount Pleasant, MI (US); Darrel Jay Walker, Mount Pleasant, MI (US); Travis James Krchmar, Harrison, MI (US)

(73) Assignee: The Delfield Company, LLC, Mt. Pleasant, MI (US)

( * ) Notice: Subject to any disclaimer, the term of this patent is extended or adjusted under 35 U.S.C. 154(b) by 0 days.

(21) Appl. No.: 13/646,135

(22) Filed: Oct. 5, 2012

(65) Prior Publication Data
US 2013/0087582 A1     Apr. 11, 2013

Related U.S. Application Data

(60) Provisional application No. 61/544,229, filed on Oct. 6, 2011.

(51) Int. Cl.
| | |
|---|---|
| *B67D 1/00* | (2006.01) |
| *B67D 7/14* | (2010.01) |
| *B67D 7/80* | (2010.01) |
| *G01F 11/20* | (2006.01) |
| *B67D 3/00* | (2006.01) |
| *B67D 7/06* | (2010.01) |
| *F25B 25/00* | (2006.01) |
| *F25C 5/00* | (2006.01) |
| *G01F 11/24* | (2006.01) |
| *F25C 5/18* | (2006.01) |

(52) U.S. Cl.
CPC ................. *F25C 5/187* (2013.01); *F25C 5/002* (2013.01); *G01F 11/24* (2013.01); *G01F 11/20* (2013.01)

USPC .......... 222/240; 222/56; 222/146.6; 222/526; 62/332

(58) Field of Classification Search
USPC ............. 222/56, 108, 144, 146.6, 185.1, 239, 222/330, 526; 141/351, 361; 62/332, 337, 62/344
See application file for complete search history.

(56) References Cited

U.S. PATENT DOCUMENTS

| | | | |
|---|---|---|---|
| 2,008,106 A | 7/1935 | Lawrence | ...................... 366/197 |
| 2,653,733 A | 9/1953 | Rudd et al. | ..................... 222/145 |

(Continued)

FOREIGN PATENT DOCUMENTS

| | | |
|---|---|---|
| EP | 0176259 | 1/1990 |
| JP | 2004326246 A | 11/2004 |

(Continued)

OTHER PUBLICATIONS

International Search Report and Written Opinion dated Mar. 11, 2013 from corresponding PCT/US2012/058925, pp. 17.

*Primary Examiner* — J. Casimer Jacyna
*Assistant Examiner* — Vishal Pancholi
(74) *Attorney, Agent, or Firm* — Ohlandt, Greeley, Ruggiero & Perle, L.L.P.

(57) ABSTRACT

An ice portion control module is provided that includes an ice bin for storing ice having a base in the ice bin having one or more portion control compartments and one or more magnets associated with the one or more portion control compartments, the one or more portion control compartments having an interior volume to hold a predetermined portion of the ice, an actuator which moves the one or more portion control compartments between a fill position wherein the one or more portion control compartments holds the ice, and a dispense position wherein the predetermined portion of the ice is dispensed out of the one or more portion control compartments, and a sensor outside of the ice bin that detects the one or more magnets.

8 Claims, 22 Drawing Sheets

(56) References Cited

U.S. PATENT DOCUMENTS

| | | | |
|---|---|---|---|
| 2,855,007 A | 10/1958 | Erickson et al. | 99/275 |
| 3,101,872 A | 8/1963 | Dickinson | 222/197 |
| 3,154,123 A | 10/1964 | Tomlinson | 241/101.6 |
| 3,156,103 A | 11/1964 | Ross | 62/331 |
| 3,295,997 A | 1/1967 | Tomlinson et al. | 241/34 |
| 3,360,045 A | 12/1967 | Lunde | 62/320 |
| 3,505,075 A | 4/1970 | Black | 98/28 |
| 3,592,367 A | 7/1971 | Landis et al. | 222/394 |
| 3,615,673 A | 10/1971 | Black et al. | 98/79 |
| 3,704,599 A | 12/1972 | Darby et al. | 62/354 |
| 3,987,211 A | 10/1976 | Dunn et al. | 426/551 |
| 4,083,462 A | 4/1978 | Teske et al. | 214/17 D |
| 4,276,750 A | 7/1981 | Kawasumi | 62/137 |
| 4,392,588 A | 7/1983 | Scalera | 222/129.4 |
| 4,531,380 A | 7/1985 | Hagen | 62/320 |
| 4,590,975 A | 5/1986 | Credle, Jr. | 141/1 |
| 4,610,145 A | 9/1986 | Arzberger et al. | 62/127 |
| 4,638,875 A | 1/1987 | Murray | 177/1 |
| 4,653,281 A | 3/1987 | Van der Veer | 62/71 |
| 4,681,030 A | 7/1987 | Herbert | 99/484 |
| 4,708,487 A | 11/1987 | Marshall | 366/206 |
| 4,745,773 A | 5/1988 | Ando | 62/320 |
| 4,790,240 A | 12/1988 | Henn et al. | 99/282 |
| 4,932,223 A | 6/1990 | Paul et al. | 62/354 |
| 4,941,593 A | 7/1990 | Hicks et al. | 222/148 |
| 4,962,866 A | 10/1990 | Phillips | 221/8 |
| 5,036,892 A | 8/1991 | Stembridge et al. | 62/1 |
| 5,067,819 A | 11/1991 | Heinhold et al. | 366/138 |
| 5,068,116 A | 11/1991 | Gibney et al. | 426/231 |
| 5,104,007 A | 4/1992 | Utter | 222/146.6 |
| 5,192,131 A | 3/1993 | Hatfield | 366/138 |
| 5,208,050 A | 5/1993 | Ney | 425/202 |
| 5,280,845 A | 1/1994 | Leight | 221/2 |
| 5,323,691 A | 6/1994 | Reese et al. | 99/275 |
| 5,350,082 A | 9/1994 | Kiriakides et al. | 141/1 |
| 5,439,289 A | 8/1995 | Neilson | 366/207 |
| 5,549,219 A | 8/1996 | Lancaster | 221/1 |
| 5,619,901 A | 4/1997 | Reese et al. | 99/275 |
| 5,683,011 A | 11/1997 | Miliani | 222/56 |
| 5,690,253 A | 11/1997 | LaFleur | 222/102 |
| 5,698,247 A | 12/1997 | Hall | 426/66 |
| 5,778,761 A | 7/1998 | Miller | 99/275 |
| 5,797,519 A | 8/1998 | Schroeder et al. | 222/129.1 |
| 5,803,377 A | 9/1998 | Farrell | 241/36 |
| 5,833,362 A | 11/1998 | Shepard | 366/111 |
| 5,839,291 A | 11/1998 | Chang | 62/126 |
| 5,863,118 A | 1/1999 | Ackels et al. | 366/129 |
| 5,910,164 A | 6/1999 | Snelling et al. | 62/344 |
| 5,911,749 A | 6/1999 | Sugie | 62/354 |
| 5,934,516 A | 8/1999 | Strycharske et al. | 222/158 |
| 5,960,701 A | 10/1999 | Reese et al. | 99/275 |
| 5,967,367 A | 10/1999 | Orsborn | 222/30 |
| 6,068,875 A | 5/2000 | Miller et al. | 426/565 |
| 6,196,712 B1 | 3/2001 | Elm | 366/197 |
| 6,202,894 B1 | 3/2001 | Struminski et al. | 222/129.3 |
| 6,269,973 B1 | 8/2001 | Bennett et al. | 221/1 |
| 6,283,627 B1 | 9/2001 | Fromm | 366/260 |
| 6,293,691 B1 | 9/2001 | Rebordosa et al. | 366/129 |
| 6,338,569 B1 | 1/2002 | McGill | 366/144 |
| 6,490,872 B1 | 12/2002 | Beck et al. | 62/303 |
| 6,504,481 B2 | 1/2003 | Teller | |
| 6,581,393 B2 | 6/2003 | Newman et al. | |
| 6,607,096 B2 | 8/2003 | Glass et al. | 222/100 |
| 6,616,323 B2 | 9/2003 | McGill | 366/201 |
| 6,684,646 B2 | 2/2004 | Voute et al. | 62/66 |
| 6,705,356 B2 | 3/2004 | Barton et al. | 141/2 |
| 6,722,675 B2 | 4/2004 | Bidwell | 280/89 |
| 6,730,348 B2 | 5/2004 | Miller et al. | 426/565 |
| 6,772,675 B2 | 8/2004 | Ervin | 99/275 |
| 6,945,157 B2 | 9/2005 | Brown et al. | 99/275 |
| D526,170 S | 8/2006 | Gugni | D7/706 |
| 7,175,046 B2 | 2/2007 | Yao | 221/265 |
| 7,207,506 B1 | 4/2007 | Dickson, Jr. et al. | 241/21 |
| 7,237,691 B2 | 7/2007 | Danby et al. | 222/105 |
| 7,237,692 B2 | 7/2007 | Bodum | 222/109 |
| 7,278,275 B2 | 10/2007 | Voglewede et al. | 62/320 |
| D555,678 S | 11/2007 | Broersen et al. | D15/89 |
| 7,325,485 B2 | 2/2008 | Carhuff et al. | 99/452 |
| 7,383,966 B2 | 6/2008 | Ziesel | 222/100 |
| 7,475,795 B2 | 1/2009 | Faller et al. | 222/95 |
| 7,614,524 B2 | 11/2009 | Girard et al. | 222/129.4 |
| 7,748,571 B2 | 7/2010 | Goff et al. | 222/146.6 |
| 7,757,896 B2 | 7/2010 | Carpenter et al. | 222/129.4 |
| 8,074,837 B2 | 12/2011 | Nevarez et al. | 222/56 |
| 2002/0194999 A1 | 12/2002 | Ervin | 99/275 |
| 2005/0183426 A1 | 8/2005 | Learned | 426/565 |
| 2005/0242120 A1 | 11/2005 | Sato et al. | 99/290 |
| 2006/0277937 A1 | 12/2006 | Schlosser et al. | |
| 2007/0084888 A1 | 4/2007 | Santos et al. | 222/631 |
| 2007/0095859 A1 | 5/2007 | Maser et al. | 222/148 |
| 2007/0205220 A1 | 9/2007 | Rudick et al. | 222/129.4 |
| 2007/0289991 A1 | 12/2007 | Jensen | 222/1 |
| 2008/0089983 A1 | 4/2008 | Coste | 426/106 |
| 2008/0093382 A1 | 4/2008 | Sher et al. | 222/129.1 |
| 2008/0279040 A1 | 11/2008 | Nielson | 366/138 |
| 2010/0139493 A1 | 6/2010 | Nevarez et al. | 99/275 |
| 2010/0145522 A1 | 6/2010 | Claesson et al. | 700/265 |
| 2010/0314410 A1 | 12/2010 | Nevarez et al. | 222/129.1 |
| 2010/0318225 A1 | 12/2010 | Claesson et al. | 700/265 |
| 2010/0323071 A1 | 12/2010 | Nevarez et al. | 426/231 |
| 2011/0168738 A1 | 7/2011 | Nevarez et al. | 222/129.1 |

FOREIGN PATENT DOCUMENTS

| | | |
|---|---|---|
| WO | 2002-082959 | 10/2002 |
| WO | 2008-105107 | 9/2008 |

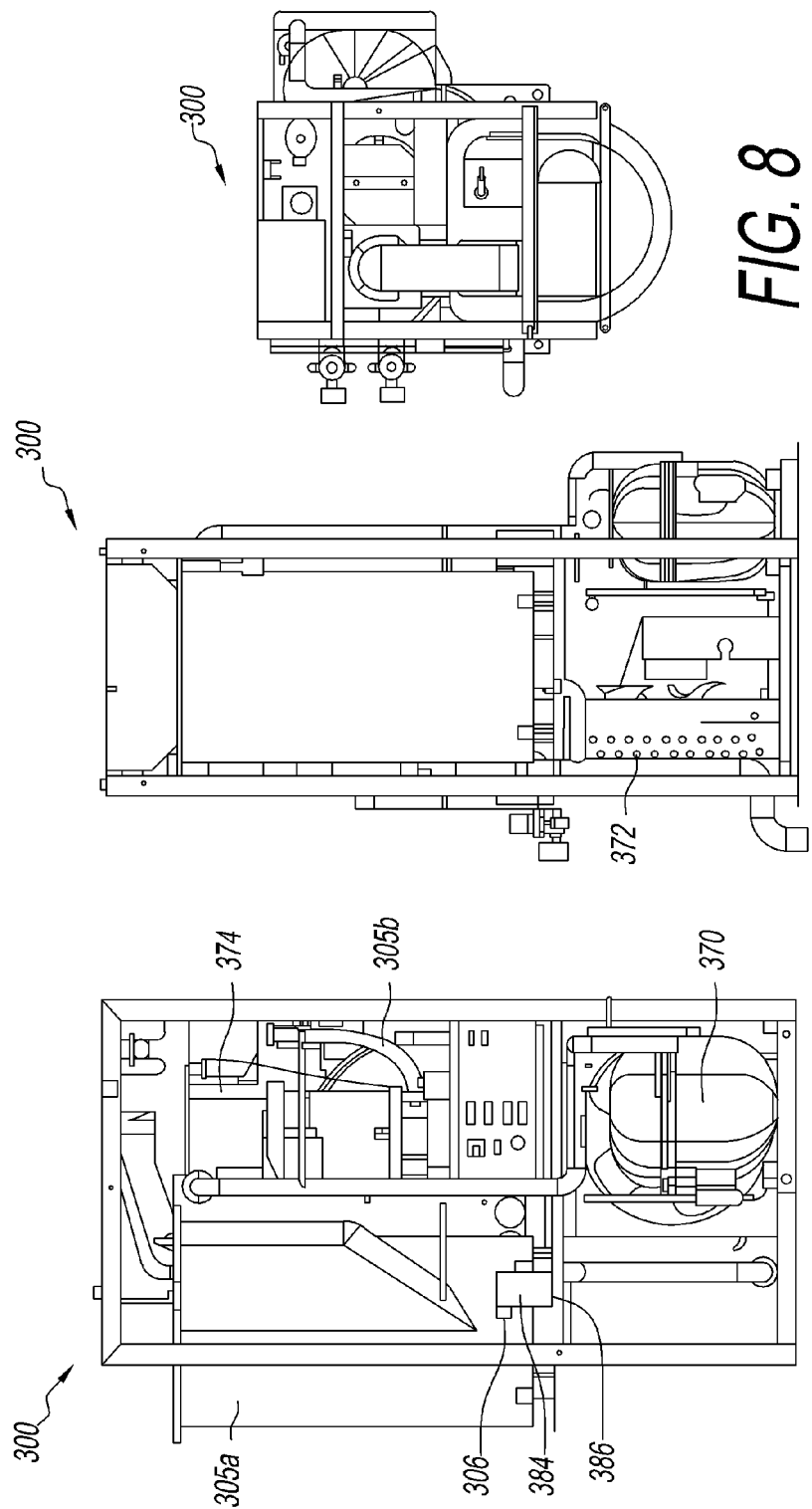

METHOD AND SYSTEM FOR A BEVERAGE DISPENSING ASSEMBLY

CROSS REFERENCE TO RELATED PATENT APPLICATIONS

This application claims the benefit of U.S. Provisional Application No. 61/544,229, filed Oct. 6, 2011. The contents of U.S. Provisional Application No. 61/544,229, filed Oct. 6, 2011, are hereby incorporated herein by reference in their entirety.

BACKGROUND OF THE DISCLOSURE

1. Field of the Disclosure

The present disclosure relates generally to a method and apparatus for a beverage dispensing assembly. More particularly, the present disclosure relates to a portion control module that is usable in a beverage dispensing assembly that portions and dispenses ice into a container. The present disclosure also relates to a blending/cleaning module that is usable in a beverage dispensing assembly.

2. Description of Related Art

Multiple steps are involved in creating a beverage or drink, for example, a smoothie drink, from beginning to end, and potential issues can occur at all stages. Smoothie making requires the use of blender pots to create the drink, meaning that the operator is required to purchase, maintain, and then store small wares (blender pots). Limitations of current technology also require the labor intensive transportation of ice to the smoothie machine from a separate icemaking machine in order to maintain a level of usable ice in the smoothie machine. This ice transfer is an issue for many reasons. First, labor is required to transport the ice typically from a back storage room to the point of sale (POS) counter area of a restaurant, where the smoothie machines are typically located. This ice transfer can create a safety hazard for employees who could slip and fall on wet floors or injure themselves by improperly carrying a heavy bucket. It can also increase the likelihood of ice contamination through mishandling.

After the ice is manually added, the juice and any additional fruit or flavor "mix-in" is added by the operator as well. Finally, a size of cup is chosen, and the drink is poured. This last step presents the largest chance for waste. Since the employee must portion the ingredients by hand, any overspill of the drink is left in the blender pot. At each step during this manual process, portion control is compromised, and money is potentially wasted on excess ingredients.

Once the order is complete and the customer has his or her drink, there is one last step to finalize the process—the method of manually cleaning the blender pot after each use to prevent the transfer of flavors and germs. Often, to save time, the blender pots are rinsed in a sink, which can compromise sanitation. While this might seem insignificant, flavor contamination can be a serious threat if customers have food allergies. Another drawback to the washing process is that it involves a substantial amount of time and labor on the part of the operator.

Each step in this process to create a smoothie takes time, typically four to five minutes, and that time could be better spent serving customers or taking more food and beverage orders, directly contributing to the bottom line.

Although premium beverages such as smoothies are growing in popularity, most quick-service restaurants (QSRs) are unable to offer customers these options due to the time limitations of the quick-serve world. Those QSR owners that do opt to serve smoothies are confronted with a common set of challenges—mainly how to sell the same franchised drink time after time with existing labor and equipment limitations.

Accordingly, it has been determined by the present disclosure, there is a need for an assembly that uniformly portions and dispenses ice. The present inventors have also developed a unique integrated blender module that is capable of blending and/mixing beverage flavors/ingredients with ice, and thereafter automatically self cleans itself for immediate reuse without subsequent flavor contamination.

SUMMARY

An ice portion control module is provided that includes an ice bin for storing ice having a base in the ice bin having one or more portion control compartments and one or more magnets associated with the one or more portion control compartments, the one or more portion control compartments having an interior volume to hold a predetermined portion of the ice, an actuator which moves the one or more portion control compartments between a fill position wherein the one or more portion control compartments holds the ice, and a dispense position wherein the predetermined portion of the ice is dispensed out of the one or more portion control compartments, and a sensor outside of the ice bin that detects the one or more magnets.

A blending/mixing/cleaning module is also provided that includes a blender compartment forming an interior volume having an opening, the blender compartment having a sensor; and a door covering the opening in a closed position and exposing the opening in an open position, the door being connected to a magnet that is detectable by the sensor in the closed position.

The above-described and other advantages and features of the present disclosure will be appreciated and understood by those skilled in the art from the following detailed description, drawings, and appended claims.

BRIEF DESCRIPTION OF THE DRAWINGS

FIG. 6 is a side view of the ice making and portioning module of FIG. 5.

FIG. 7 is a front view of the ice making and portioning module of FIG. 5.

FIG. 8 is a top view of the ice making and portioning module of FIG. 5.

DETAILED DESCRIPTION OF THE DISCLOSURE

Figure 1:
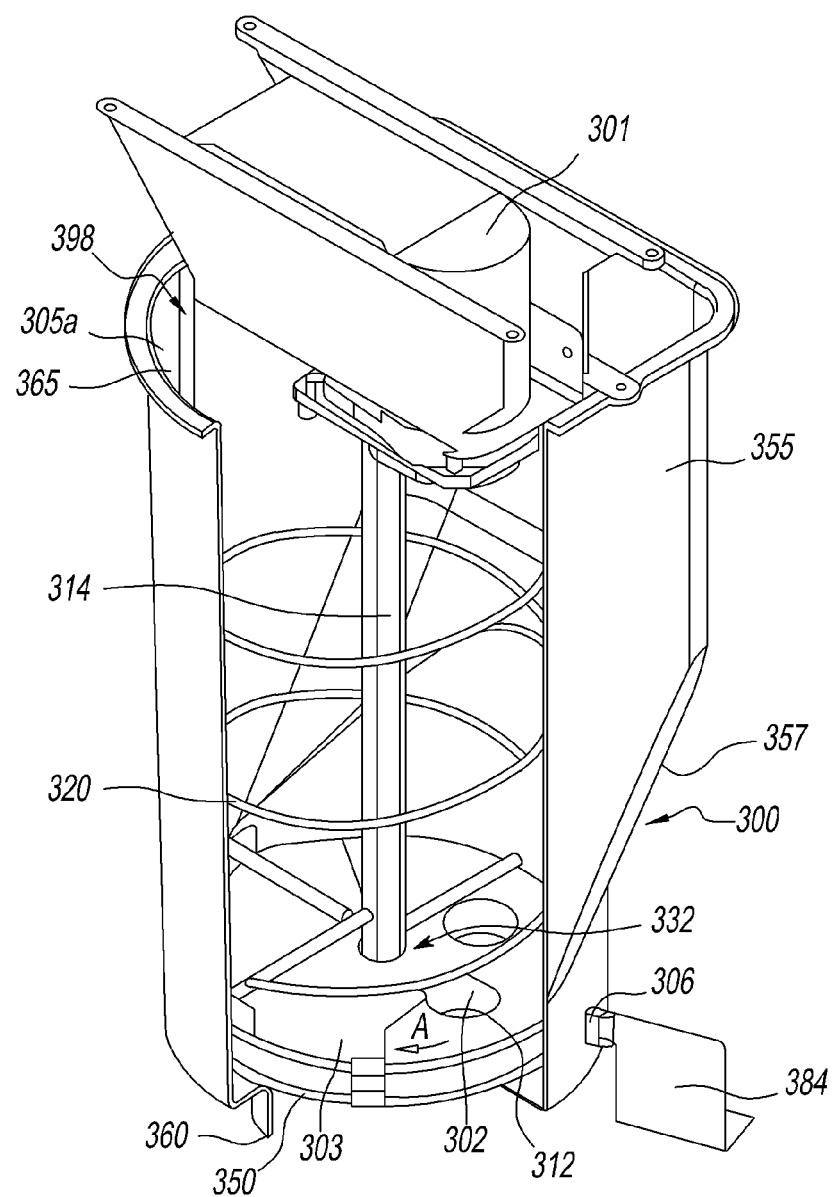
FIG. 1 is top side perspective view of an ice bin, wedge and portion control assembly according to the present disclosure wherein the front right-side portion of the ice bin has been cut away.

Referring to the drawings and in particular to FIG. 1, an exemplary embodiment of an ice storage and portion control module is generally referred to by 300. Ice storage and portion control module 300 has a portion control compartment shown in FIG. 1 as one or more portion cups 302 that are fillable with ice. Portion cups 302 are within an ice bin 305a that stores ice. Ice bin 305a has a wall 350 and a sidewall 355 that surrounds wall 350 and forms an opening 365. A portion of sidewall 355 may have an angled portion 357 that directs ice to portion cups 302 to fill portion cups 302 with the ice in ice bin 305a. Wall 350 has a hole 360 therethrough. Ice bin 305a is filled with ice through opening 365 over portion cups 302 so that portion cups 302 are filled with the ice by gravity with the ice in ice bin 305a. Portion cups 302 are moveable, for example, rotatable, as shown by arrow A in FIG. 1, in ice bin 305a to move from a fill position to a dispense position so that a portion of ice dispensed from ice storage and portion control module 300 can be controlled.

Figure 2:
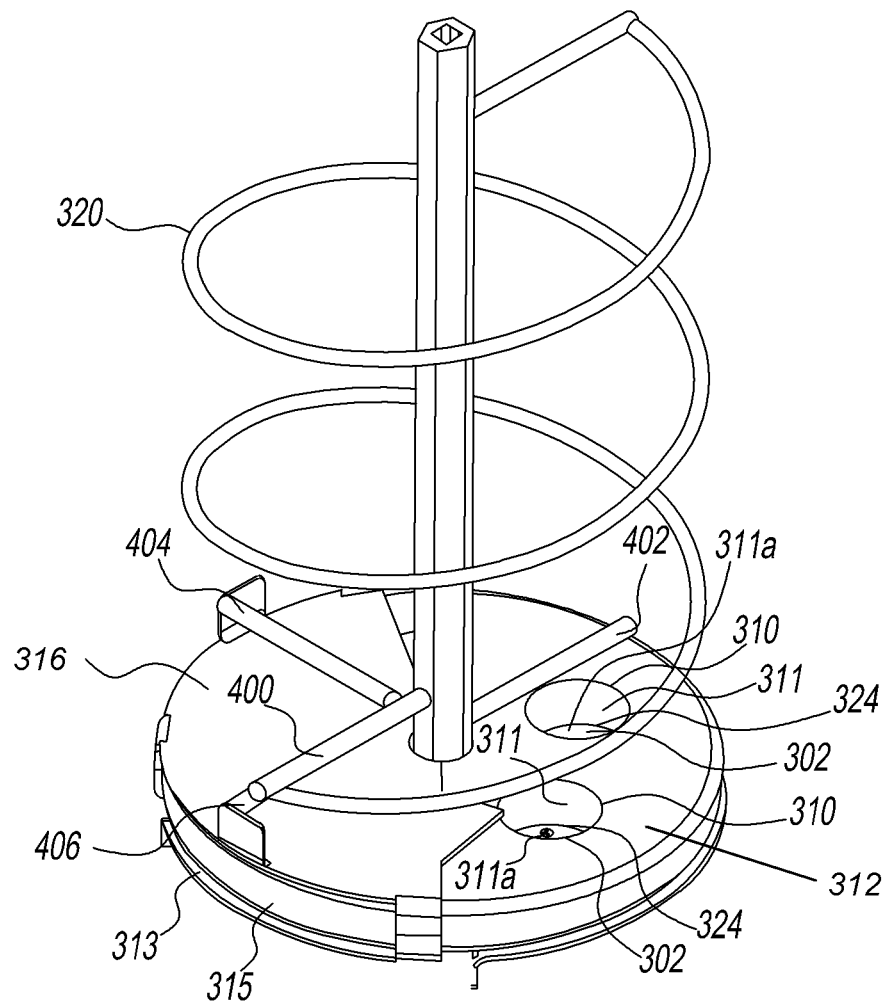
FIG. 2 is a top front perspective view of the wedge and portion control assembly of FIG. 1.

Referring to FIG. 2, a first plate 312 has apertures 310 therethrough. First plate 312 may have a circular shape. Each of apertures 310 has a sidewall 311 that extends from first plate 312. Portion cups 302 each have a dispensing port, for example, an opening 311a formed by sidewall 311. Portion cups 302 are at least formed by sidewall 311.

Figure 3:
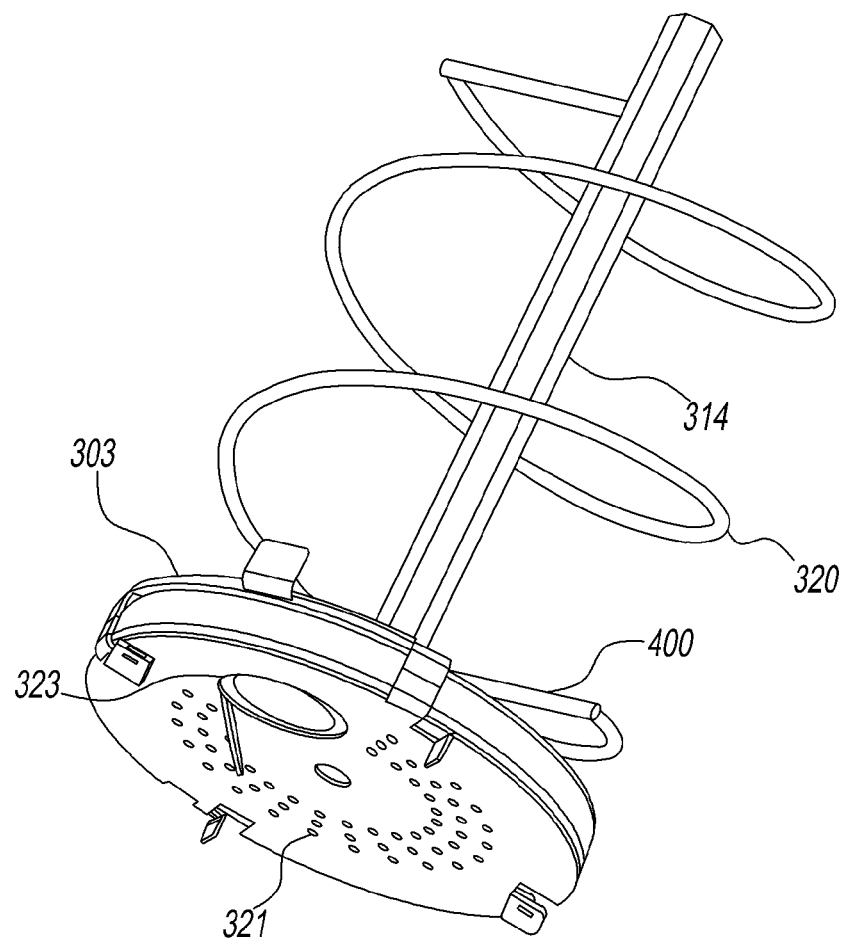
FIG. 3 is a bottom front perspective view of the wedge and portion control assembly of FIG. 1.
Figure 15:
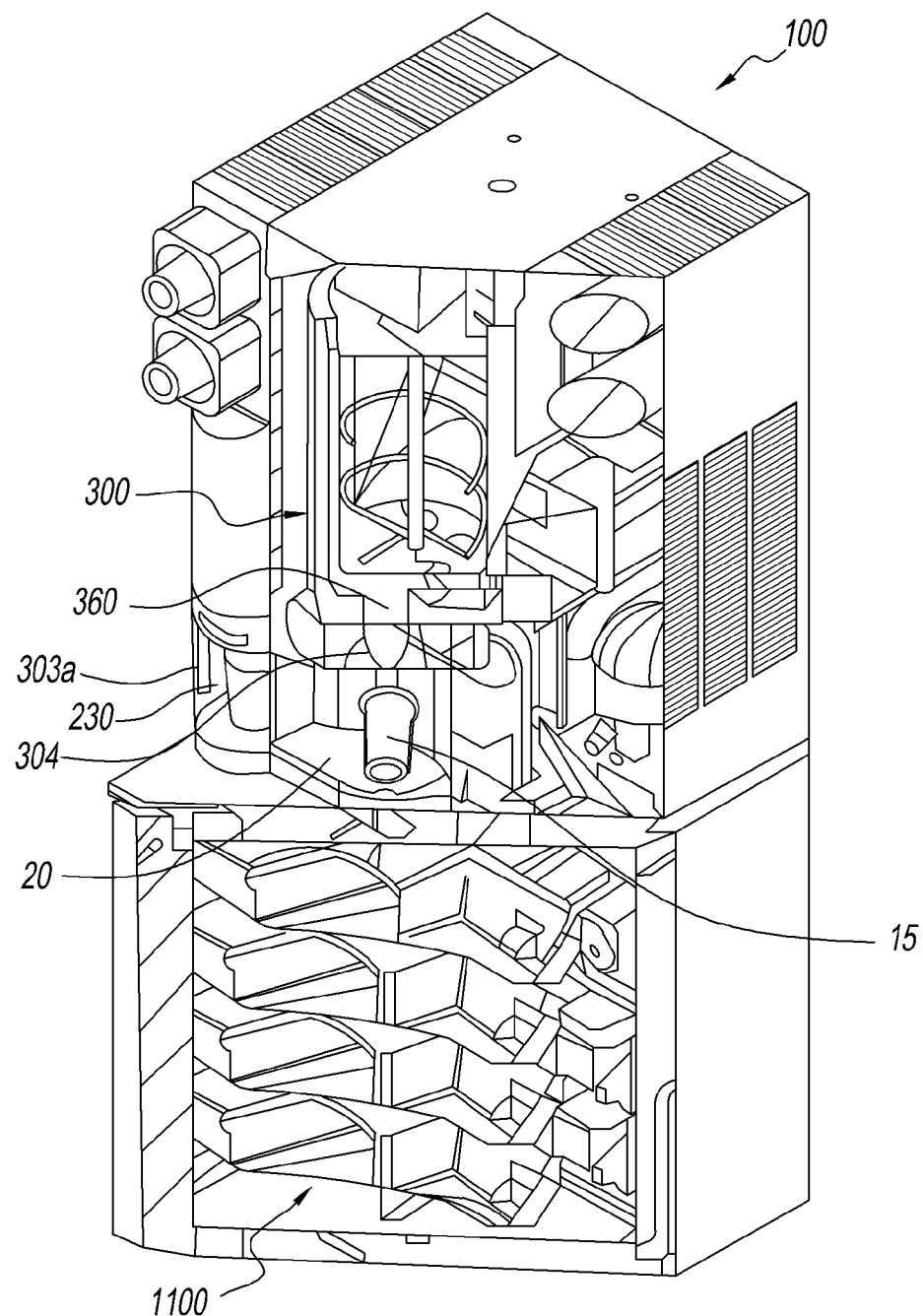
FIG. 15 is a top front right-side perspective view of an assembly that dispenses and mixes beverages of the present disclosure wherein the front right-side portion has been cut away to depict each of the ice making and portioning module, and dispensing module.

First plate 312 is positioned on a second plate 313 so that sidewall 311 of each aperture 310 abuts second plate 313 covering opening 311a to form an interior volume for each of portion cups 302. First plate 312 is connected to a third plate 315 by sidewall 311. Third plate 315 has apertures 324. Each of apertures 324 of third plate 315 aligns with one of apertures 310 through first plate 312 and opening 311a forming a passage therethrough. First plate 312, second plate 313, and/or third plate 315 is sized to cover wall 350 to control the ice dispensed from ice bin 305a through hole 360. Alternatively, third plate 315 may be omitted so that sidewall 311 is connected only to first plate 312. Another alternative omits first plate 312 so that sidewall 311 is connected only to third plate 315, however, sidewall 311 moving without first plate 312 through the ice in ice bin 305a during rotation may generate additional torque as compared to sidewall 311 that is connected to first plate 312. Portion cups 302 have a predetermined size to hold a predetermined volume of ice. Portion cups 302 may be any size, such as, for example, about 1 ounce. Referring to FIG. 3, second plate 313 has a dispensing aperture 323 that is aligned with hole 360 and a nozzle 304, as shown in FIG. 15.

As shown in FIG. 3, water is removed from portion cups 302 via perforated holes 321 disposed in second plate 313. The ice may melt while within portion cups 302, and is removed by draining through perforated holes 321 while each of portion cups 302 are disposed on second plate 313 by gravity so that the water is not dispensed with the ice when each of portion cups 302 passes over dispensing aperture 323. The water that drains from portion cups 302 passes through perforated holes 321 onto wall 350 that surrounds hole 360. Wall 350 may be shaped, for example, angled, to direct the water to a drainage aperture (not shown) through wall 350 to drain the water out of ice bin 305a.

Referring to FIG. 1, first plate 312 is connected to a drive assembly 301 by a connector bar 314 to rotate portion cups 302. Connector bar 314 is connected to first plate 312 through a first opening 332 so that first plate 312 rotates with connector bar 314. Drive assembly 301 may be, for example, a gear drive motor that connects to a power source. Drive assembly 301 rotates connector bar 314 that rotates portion cups 302 formed by first plate 312, sidewall 311 and third plate 315. Portion cups 302 that are filled with ice rotate with connector bar 314 on first plate 312 while second plate 313 remains stationary. Each of portion cups 302 remains filled with ice on second plate 313 until the portion cup passes over dispensing aperture 323 in second plate 313. When each of portion cups 302 is rotated to pass over dispensing aperture 323 in second plate 313, the ice in each of portion cups 302 passes through opening 311a and dispensing aperture 323 in second plate 313, through hole 360, and to dispenser nozzle 304, as shown in FIG. 15, to dispense the ice out of ice storage and portion control module 300, for example, into cup 15, as shown in FIG. 15. The ice passes through opening 311a and dispensing aperture 323 in second plate 313, through hole 360, and to dispenser nozzle 304 due to the weight of the ice within the one of portion control cups 302 aligned with aperture 323.

Dispensing aperture 323 may be a plurality of dispensing apertures disposed within second plate 313 so that each of portion cups 302 remains filled with ice on second plate 313 until the portion cup passes over one of the plurality of dispensing apertures in second plate 313. When each of portion cups 302 is rotated to pass over one of the plurality of dispensing apertures in second plate 313, the ice therein passes through opening 311a and through the one of the plurality of dispensing apertures. More than one of portion cups 302 may each align with one of the plurality of dispensing apertures at the same time. The plurality of dispensing apertures disposed within second plate 313 allows the ice to be dispensed from ice storage and portion control module 300 to more than one container, for example, two or more cups 15.

FIG. 1 shows a sensor 306. Sensor 306 is connected to a sensor support 384. As shown in FIG. 6, sensor support 384 connects to a portion control housing 386 to position sensor 306 outside of storage bin 305a.

Figure 3A:
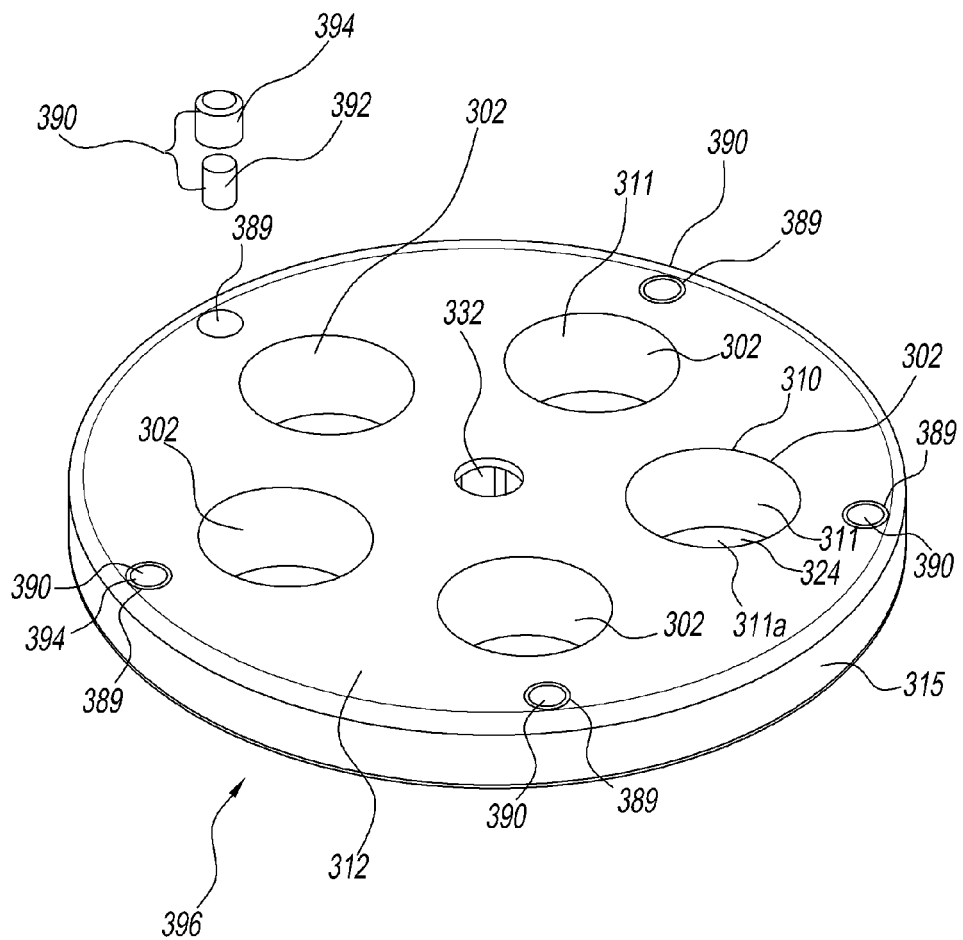
FIG. 3A is a top front perspective view of a first plate, side walls, and a third plate that form portion cups of portion control assembly of FIG. 1 showing magnet assemblies in place and an exploded view of one of the magnet assemblies.

FIG. 3A shows first plate 312, side wall 311, third plate 315 that form portion cups 302. First plate 312 has openings 389. Openings 389 are sized so that magnet assemblies 390 fit therein. Magnet assembles 390 each have a magnet 392 and a magnet cover 394. Magnet 392 fits in magnet cover 394. Magnet cover 394 connects to third plate 315 to connect magnet 392 to third plate 315. Magnet cover 394 can be connected to third plate 315, for example, by snap fit, adhesive and the like. Each of magnet assemblies 390 is positioned adjacent to one of portion cups 302. First plate 312, side wall 311, third plate 315 are shown as one machined piece of polyethylene to form a combination plate 396. Combination plate 396 has magnets 392 relative to each cup 302 that are inserted and held in place with caps 394 that are pressed in place forming a simplified part.

Sensor 306 communicates an output indicative of each of magnet assembles 390 as it passes by sensor 306 to a portion control controller. The portion control controller counts an amount of portion control cups 302 that are rotated over dispensing aperture 323 based on the outputs from sensor 306. For example, sensor 306 may be a reed switch so that magnet 392 attracts a portion of the switch when the magnet passes by or adjacent the switch establishing contact between the magnet and the switch. As the magnet rotates away from the switch beyond a distance that the magnet attracts the portion of the switch, the contact between the magnet and the switch is broken causing sensor 306 to communicate an output to the portion control controller indicating that the one of portion cups 302 has passed over dispensing aperture 323 so that ice from the cup is dispensed. The portion control controller activates and deactivates drive assembly 301 based upon the output of sensor 306 to rotate a predetermined amount of portion control cups 302 over dispensing aperture 323 to dispense a predetermined amount of ice from within portion cups 302.

Sensor 306 is mounted outside of storage bin 305a. Advantageously, sensor 306 that is mounted outside of storage bin 305a does not require bracketing and wiring in storage bin 305a so that sensor 306 is not exposed to moisture, moving parts and grinding ice in storage bin 305a all which could damage the sensor components of sensor 306. Sensor 306 and associated components, for example, bracketing and wiring, inside storage bin 305a would create issues with sanitation and obtaining the NSF (National Sanitation Foundation) listing required on this equipment. Sensor 306 mounted outside of storage bin 305a avoids these drawbacks.

Sensor 306 is in communication with the portion control controller so that the portion control controller counts a number of portion cups have passed over dispensing aperture 323 to determine a portion of ice that is to be dispensed as required by a menu recipe or beverage formula. For example, the portion control controller may divide a predetermined amount of ice needed for a beverage by the predetermined size of portion cups 302 to determine a number of portion cups 302 to rotate past dispensing aperture 323 and nozzle 304 to dispense the predetermined amount of ice from ice storage and portion control module 300 needed for the beverage. The portion control controller can activate drive assembly 301 to rotate portion control cups 302 past dispensing aperture 323 and nozzle 304 to dispense the ice, and deactivate drive assembly 301 after the portion control controller has counted the number of portion cups 302 that have passed over dispensing aperture 323 that equals the predetermined amount of ice needed for the beverage.

Figure 15A:
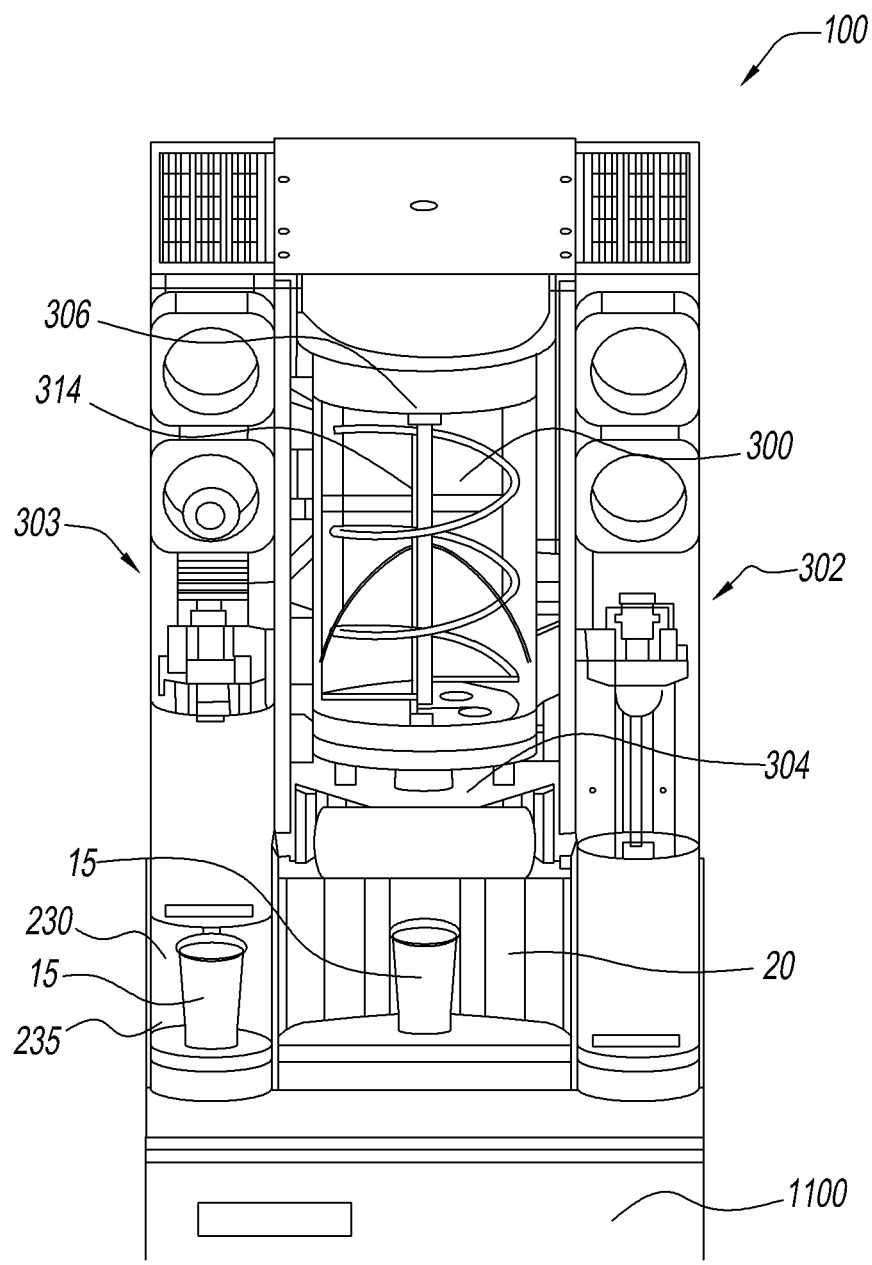
FIG. 15A is a partial front cross-sectional view of the assembly that dispenses and mixes beverages of FIG. 15.
Figure 15B:
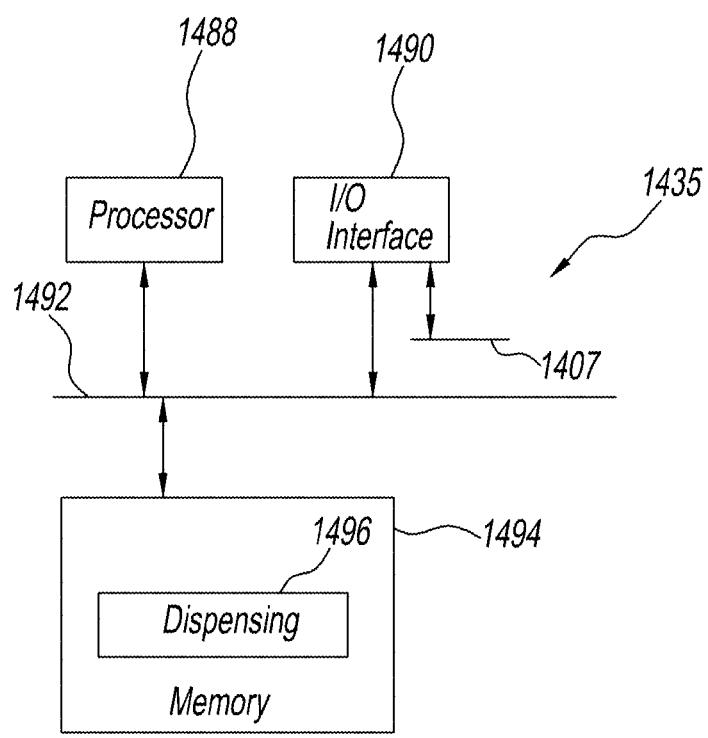
FIG. 15B is a block diagram of a controller of the ice making and portioning module according to the present disclosure.

Referring to FIG. 15B, a relay controller 1435 comprises a processor 1488, an input/output (I/O) interface 1490 and a memory 1494 interconnected via a bus 1492. Memory 1494 comprises a dispensing program 1496 for control of ice storage and portion control module 300 and various other programs, such as, an operating system, utility programs and other programs. Processor 1488 is operable to execute dispensing program 1496 and the other programs as well.

Figure 15C:
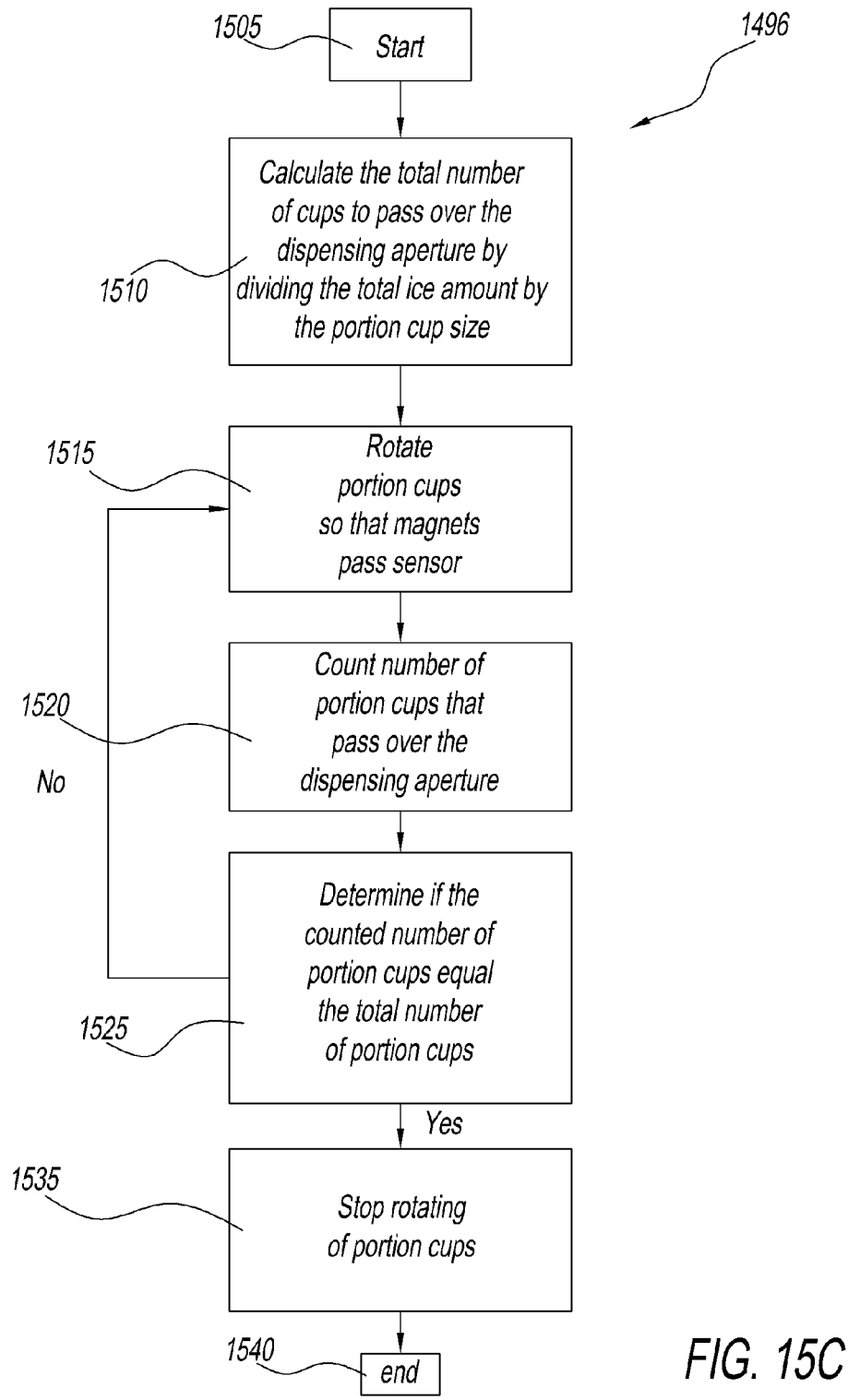
FIG. 15C is a flow diagram of the program of the controller of FIG. 15B.

Referring to FIG. 15C, a dispensing program 1496 is stored in memory 1494 and executed by processor 1488 of relay controller 1435 (FIG. 15B). At step 1505, dispensing program 1496 starts. At step 1510, a total number of portion cups 302 to pass over the dispensing aperture 323 is calculated by dividing a total ice amount from, for example, a predetermined recipe, by the size of portion cups 302. At step 1515, portion cups 302 are rotated. At step 1520, a number of portion cups 302 that pass of dispensing aperture 323 are counted. At step 1525, it is determined if the counted number of portion cups equals the total number of portion cups. If yes, rotation of portion cups 302 is stopped and dispensing program 1496 ends. If no, step 1515 and 1520 are repeated.

Ice storage and portion control module 300 controls an amount of ice dispensed out of ice storage and portion control module 300 by controlling an amount of portion cups 302 that pass over dispensing aperture 323. Portion cups 302, for example, are round and hold a predetermined amount of ice. The number of portion cups 302 that pass over dispensing aperture 323 determine the size of the drink being prepared. Portion cups 302 hold the predetermined amount of ice in the interior volume, and, as the size of the volume of ice increases or decreases, a number of portion cups 302 that pass over dispenser nozzle 304 increases or decreases based on the predetermined amount of ice needed for each beverage. Sensor 306 and magnet assemblies 390 are used to count a number of portion cups 302 that pass over dispenser nozzle 304. Counting a number of portion cups 302 that pass over dispenser nozzle 304 prevents positioning one of portion cups 302 partially over dispenser nozzle 304. For example, the portion control controller may only deactivate drive assembly 301 when sensor does not detect one of magnet assemblies 390 to ensure one of portion control cups 302 is not partially disposed over dispensing aperture 323. A weight of the ice in storage bin 305a of ice dispenser 305 causes the ice cups to fill.

FIGS. 2 and 3 show that as portion cups 302 rotate the ice is leveled by wedge 303 to provide accurate portioning. Portion control wedge 303 closes off apertures 310 of portion cups 302 as they pass towards dispensing aperture 323 and a dispense chute and hole 360 above dispenser nozzle 304 after being filled with ice, thereby ensuring that a consistent portion of ice is present in each cup 302 before it releases its content into hole 360 and the dispense chute disposed within nozzle 304. Wedge 303 levels ice in portion control cups 302 and prevents ice from falling into portion control cups 302 while each of portion control cups 302 is over dispensing aperture 323.

Figure 4:
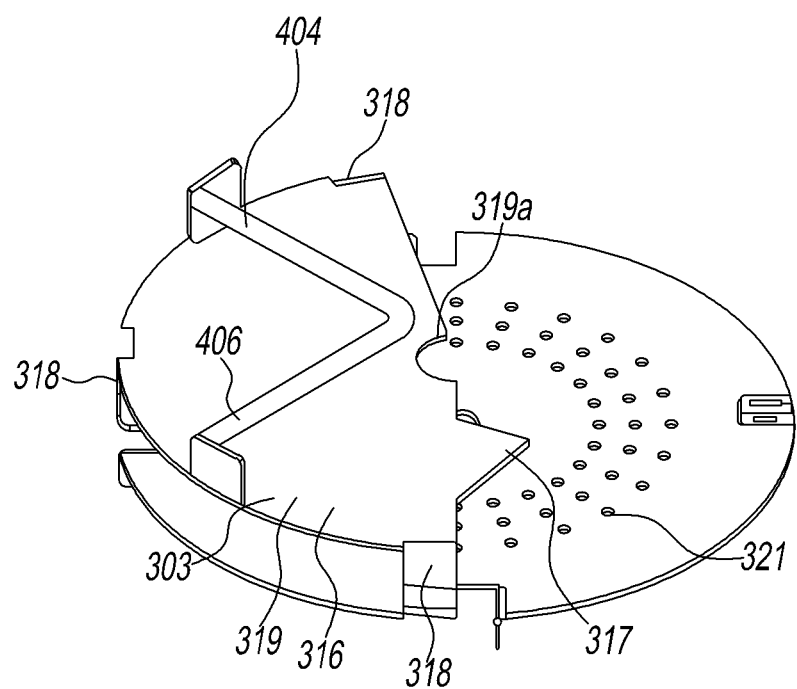
FIG. 4 is a top front perspective view of the wedge and second plate components of the portion control assembly of FIG. 1.
Figure 5:
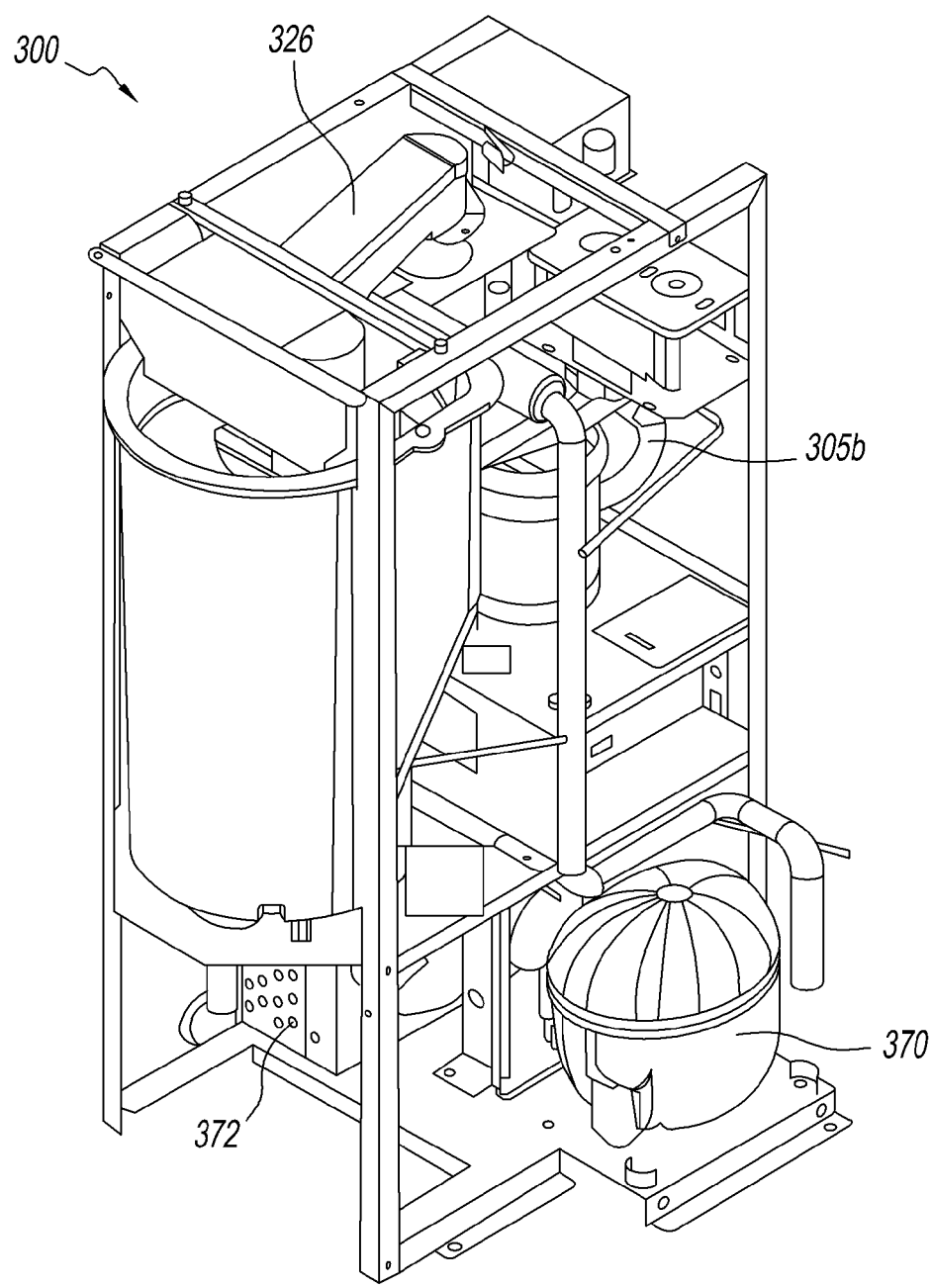
FIG. 5 is a front perspective view of an ice making and portioning module.
Figure 9:
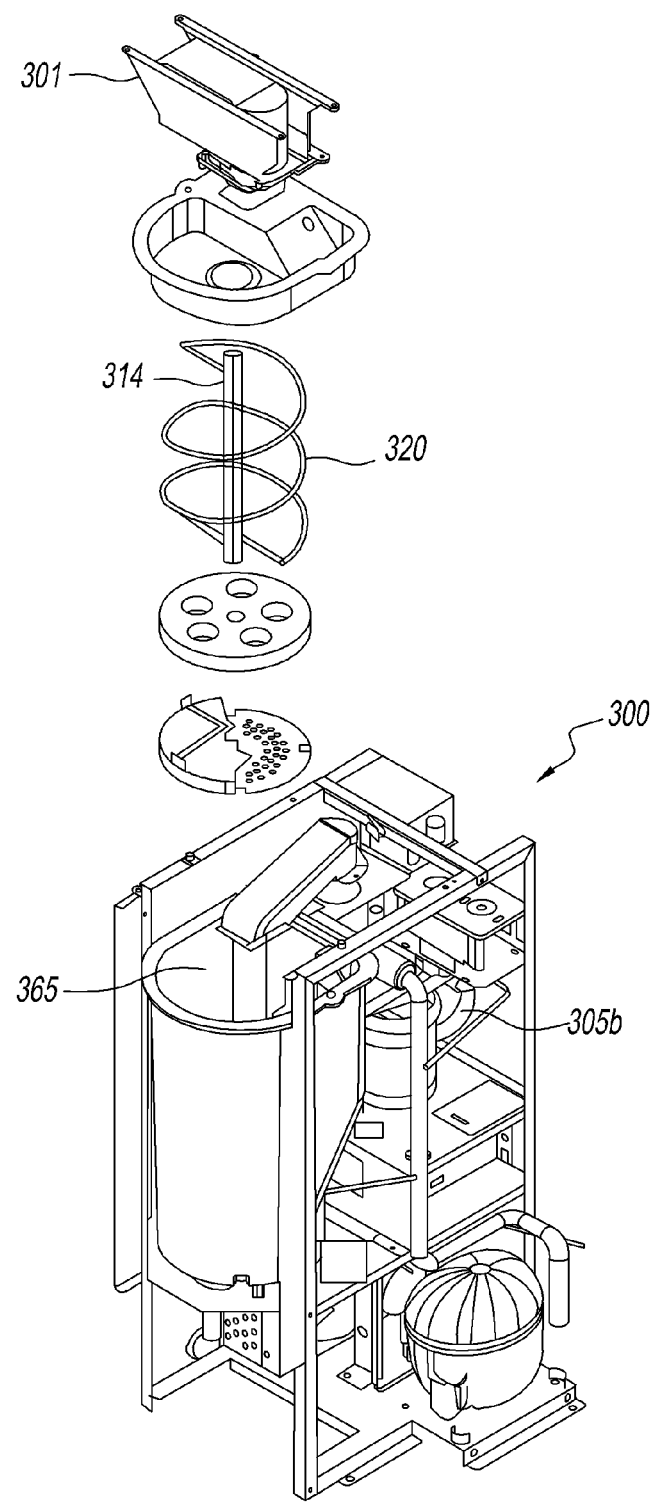
FIG. 9 is an exploded view of the ice making and portioning module of FIG. 5.
Figure 10:
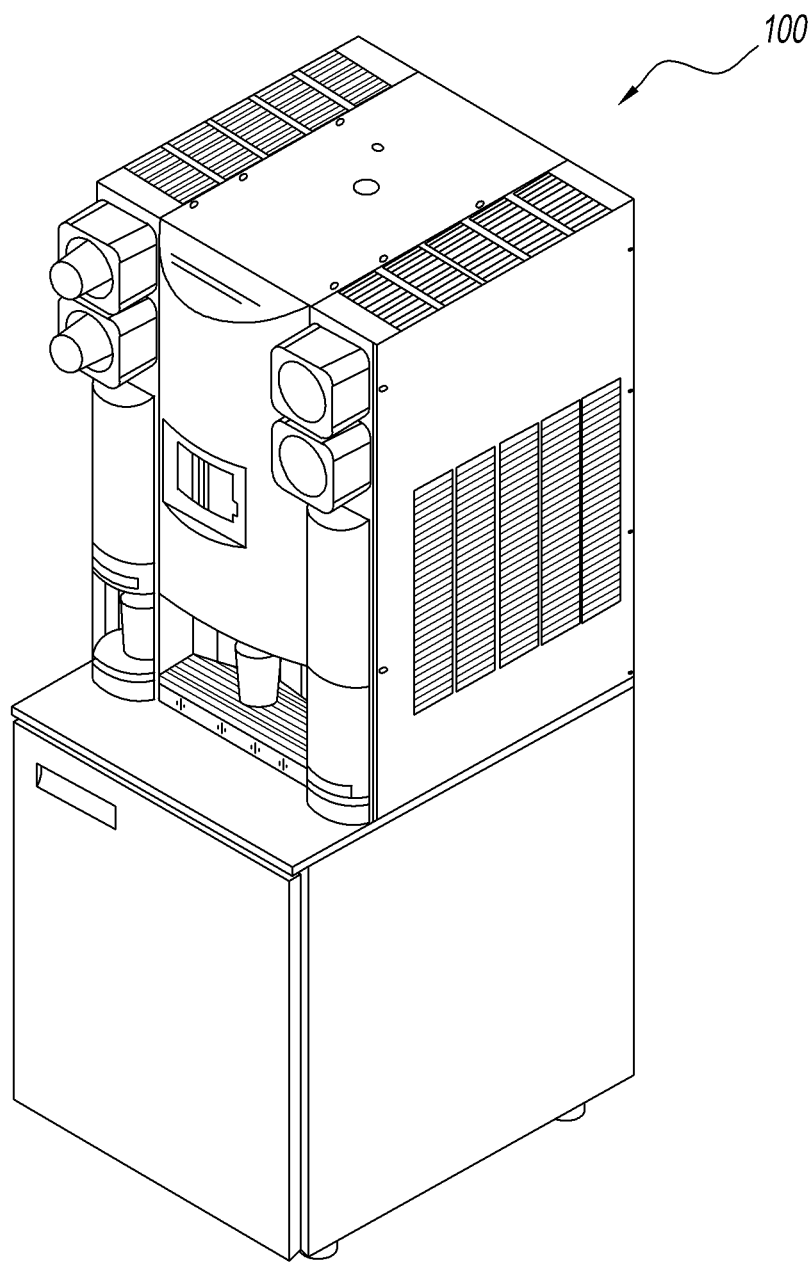
FIG. 10 is a front perspective view of an exemplary embodiment of an assembly that dispenses and mixes beverages according to the present disclosure.
Figure 13:
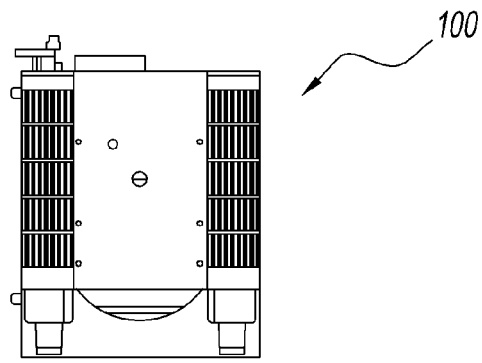
FIG. 13 is a top view of the assembly that dispenses and mixes beverages of FIG. 10.
Figures 11, 12:
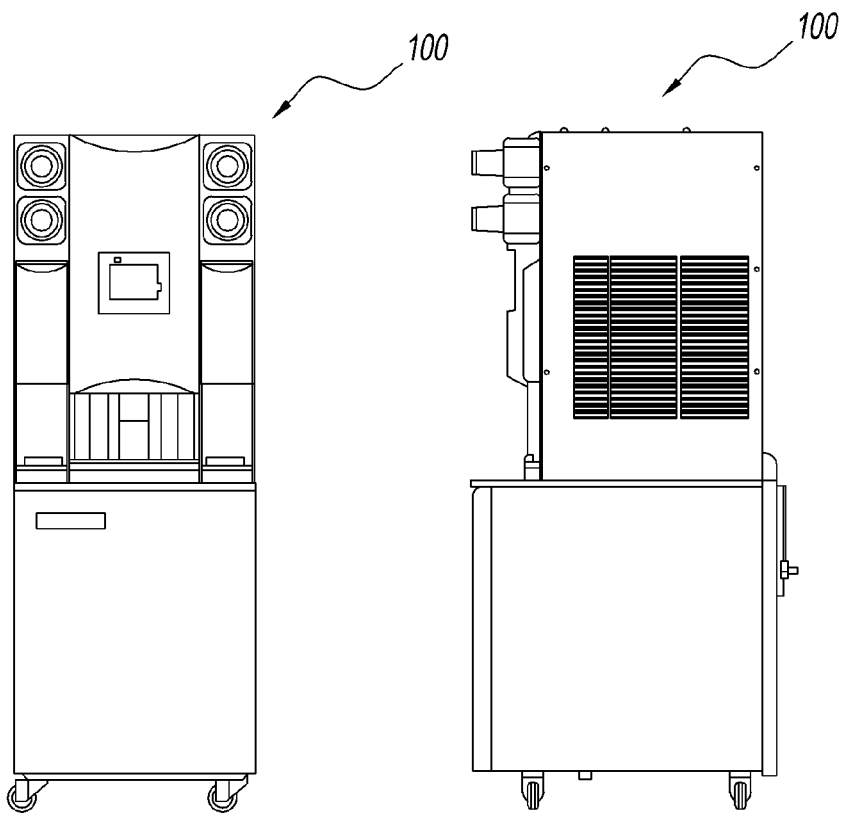
FIG. 11 is a side view of the assembly that dispenses and mixes beverages of FIG. 10.
FIG. 12 is a front view of the assembly that dispenses and mixes beverages of FIG. 10.

As shown in FIG. 4, wedge 303 may be a sheet metal wedge with a top portion 316, a side portion 318, and a bottom portion (not shown) that surround first plate 312 and second plate 313. Top portion 316 is substantially planar and substantially parallel with first plate 312 at a preselected height above cups 302. Top portion 316 has a protrusion 317 that extends from a body portion 319. Body portion 319 has a depression 319a on a side opposite side portion 318 surrounding a portion of connector bar 314 to allow connector bar 314 to rotate therein. Protrusion 317 is substantially planar and extends in a direction substantially parallel with first plate 312. Protrusion 317 displaces ice in ice bin 305a that is moved by the rotation of portion control cups 302 into contact with wedge 317 prior to body portion 319 to reduce an amount of torque on drive assembly 301 that rotates portion cups 302 in comparison to a wedge without protrusion 317 having a straight edge.

Referring to FIG. 1, ambient air may enter ice bin 305a through hole 360 melting some of the ice in proximity to hole 360. A controller may rotate drive assembly 301 to rotate portion cups 302 at a predetermined time interval so that at least one of portion cups 302 dispenses the ice therefrom out of ice storage and portion control module 300 to remove melted ice from ice storage and portion control module 300 in proximity to hole 360.

Referring to FIGS. 1-3, connector bar 314 is connected to an agitator 320 that moves ice in ice bin 305a. When ice is stored as it melts it tends to "bridge" together, forming into clumps. A form of agitation is required in the bin to keep the ice broken up so it can be properly dispensed. The agitator moves the ice in ice bin 305a to separate ice and prevent ice from congealing, and agitator 320 facilitates the direction of ice into portion control cups 302.

Agitators having shapes, for example, shaped as "pitch forks" where a first rod is connected at a perpendicular angle to connector bar 314 on one end and on an opposite end the first rod is connected to a second rod forming another perpendicular angle, when spun with the dispense mechanism, have a tendency to only break up the ice in the paths of the first rod and second rod or spin the entire bin of ice not breaking up any of the bridged ice. This also creates high amounts of torque that the motor of drive assembly 301 cannot overcome locking up the mechanism of drive assembly 301.

Agitator 320 having a spiral shape eliminates any tangential surfaces that could cause the entire ice column in ice storage bin 305a to spin and decreases the torque on drive assembly 301. Agitator 320 is located close to vertical sides of ice storage bin 305a where ice tends to stick. The spiral shape of agitator 320 also breaks this ice off the vertical sides of storage bin 305a.

Referring to FIG. 1, ice storage bin 305a has ridges 398 running top to bottom on opposite vertical sides of ice storage bin 305a. Ridges 398 break up any ice that may attach to agitator 320.

Referring to FIG. 2, agitator 320 is connected two rotatable arms 400, 402. Rotatable arms 400, 402 are connected at a bottom of agitator 320 so that arms 400, 402 rotate with agitator 320. Wedge 303 is connected to two stationary arms 404, 406. Stationary arms 404, 406 remain stationary while agitator rotates. Rotatable arms 400, 402 and stationary arms 404, 406 breakup any clumps of ice that could form in a center of agitator 320 before reaching cups 302 and prevent the ice from forming into a column in the center and spinning with agitator 320.

Ridges 398, rotatable arms 400, 402 and stationary arms 404, 406 in addition to agitator 320 further prevent ice from sticking to the sides of ice storage bin 305a and clumping of the ice stored in ice storage bin 305a which could affect dispensing ice from ice storage and portion control module 300. Their purpose along with agitator 320 is to keep the ice from clumping together which would prevent the ice from filling into portion cups 302.

Alternatively, first plate 312 is connected to drive assembly 301 by a first bar to move portion cups 302, and the agitator is connected to drive assembly 301 by a second bar to move the agitator in ice bin 305a. The first bar may be rotatable within the second bar. Drive assembly 301 moves in a first direction and a second direction that is opposite the first direction. In the first direction, drive assembly engages the first bar moving portion cups 302 to dispense ice and engages the second bar to agitate the ice. In the second direction, drive assembly 301 only engages the second bar moving the agitator through the ice in ice bin 305a to only agitate the ice while portion cups 302 do not move. For example, a ratchet coupling is connected to the first bar so that a mating coupling of drive assembly 301 engages the first bar in the first direction and does not engage the first bar in the second direction.

Another example includes the first bar having a first ratchet coupling and the second bar having a second ratchet coupling so that a mating coupling of drive assembly 301 engages the first bar in the first direction and does not engage the first bar in the second direction and engages the second bar in the second direction and does not engage the second bar in the first direction. In this example, portion cups 302 and the agitator only move separately. A further alternative includes the first bar being connected to a first drive assembly and the second bar being connected to a second assembly so that each of the first bar that moves portion cups 302 and the second bar that moves the agitator can be selectively and separately moved by different drive assemblies.

Referring to FIGS. 5-9, ice storage and portion control module 300 includes an ice maker 305b. Alternatively, ice maker 305b may be separate from ice storage and portion control module 300. Ice maker 305b may be any ice maker, and, preferably an ice maker that forms flakes of ice. For example, ice maker 305b may include an ice making head of cylindrical configuration in which a water container that is filled with water from a water source has at least one refrigerated wall forming a freezing chamber cooled by a flow of refrigerant gas, and a motor driven scraper which continuously breaks up ice forming on the refrigerated surface into ice flakes. The refrigerant gas may be cooled by a refrigeration cycle, such as, for example, a vapor compression cycle that includes a compressor 370, condenser 372, expansion valve (not shown), and evaporator 374. One or more of the compressor, condenser, expansion valve, and evaporator may be integral with or remote from ice storage and portion control module 300. For example, compressors may create undesirable noise and may be remotely located from the rest of ice storage and portion control module 300. Ice maker 305b may include an axially-extending auger or auger assembly that is rotatably disposed within the freezing chamber and generally includes a central body portion with one or more generally spirally-extending flight portions thereon disposed in the space between the central body portion and the refrigerated wall in order to rotatably scrape ice particles from the cylindrical freezing chamber. A drive means assembly rotatably drives the auger such that when make-up water is introduced into the freezing chamber through a suitable water inlet and frozen therein, the rotating auger forcibly urges quantities of ice particles through the freezing chamber to be discharged through an ice outlet end.

Nugget ice may be made from the flakes by passing the flakes of ice through an extruder head where a nugget shape is formed. Nugget ice is different from cube style ice in that the nugget is not homogenous but is multiple flakes of ice compressed into a nugget. Nugget ice is softer ice (easier to chew) that requires less power to mix into a beverage. The nuggets of ice are pushed through the extruder head and this force can be used to transport the ice to ice bin 305a of ice storage and portion control module 300, which may allow for larger ice output. Ice maker 305b reduces an overall sound level and allows for operation near a front counter or drive-through window without impacting communications. The use of nugget ice also allows the operator to use single serving cup for dispensing, blending and serving the consumer because the stress of blending cubed ice is reduced.

Ice maker 305b may be removably connected to ice storage and portion control module 300. Ice maker 305b may be removable so that another ice maker may be connected to ice storage and portion control module 300 to portion and dispense another type of ice, for example, ice maker 305b may make nugget ice that may be replaced by another ice maker that makes flake ice.

Ice maker 305b is connected with ice bin 305a so that ice made by ice maker 305b is dispensed into ice bin 305a through a conduit 326 that is connected to opening 365. Ice bin 305a may have a sensor, for example, a photosensor, that detects if the ice in ice bin 305a is below a predetermined level. The sensor communicates with an ice maker controller of ice maker 305b so that ice maker 305b makes ice and dispenses the ice therefrom into ice bin 305a when the ice is below the predetermined level in ice bin 305a.

Referring to FIGS. 10-15, ice storage and portion control module 300 may be used in an assembly that dispenses and mixes beverages 100. Ice storage and portion control module 300 may be used in an assembly that dispenses and mixes beverages as described in U.S. patent application Ser. No. 12/633,793, filed Dec. 8, 2009, the contents of which are incorporated herein by reference in its entirety.

Figure 14:
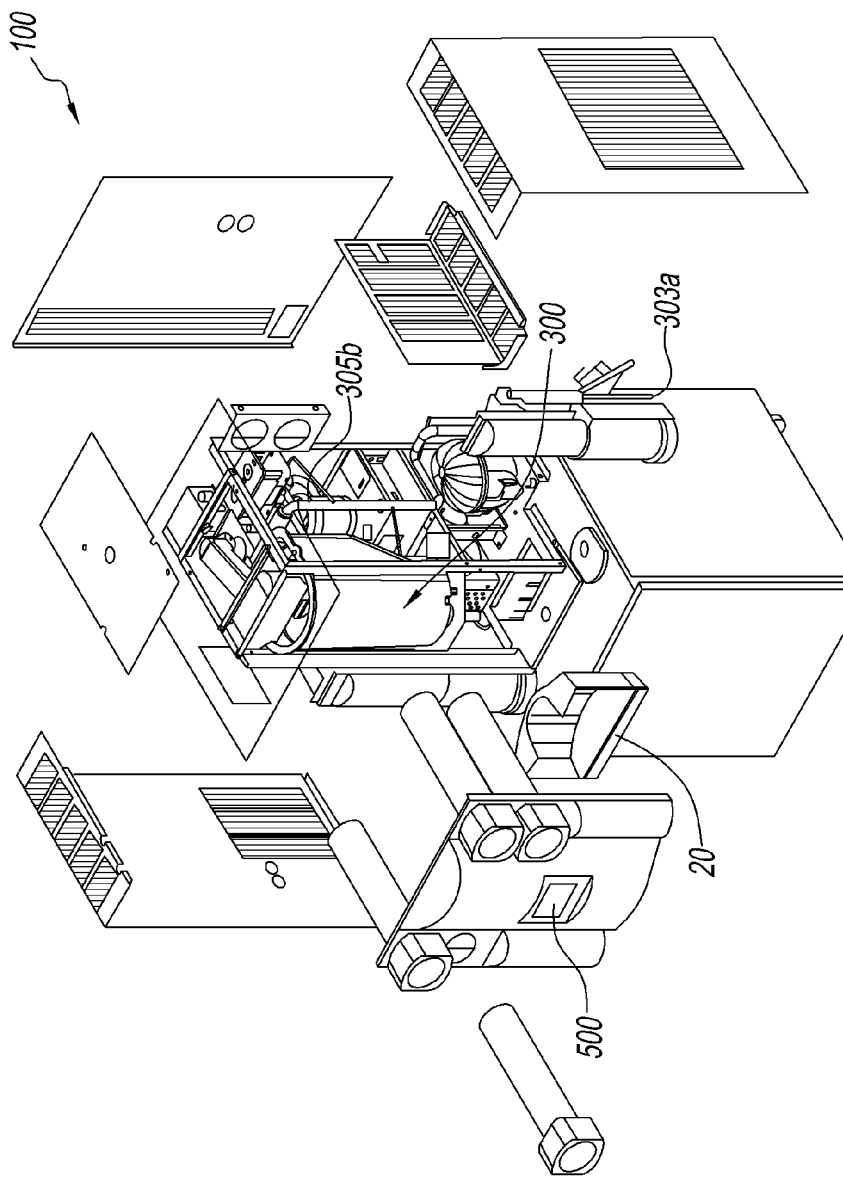
FIG. 14 is an exploded view of the assembly that dispenses and mixes beverages of FIG. 10.

Referring to FIGS. 14 and 15, assembly that dispenses and mixes beverages 100 has an onboard ice maker 305b, ice storage and portion control module 300, a flavor/ingredient dispensing module 1100, and a blender/mixer/cleaning module 303a. In use, cup 15 is placed on container holder portion 20 of assembly 100. A user may make selections through a user interface controller that incorporates a button panel, such as a control panel 500 shown in FIG. 14, in order to dispense and mix a preselected beverage, for example, a smoothie drink that includes ice and flavor ingredients. Ice storage and portion control module 300 dispenses ice to cup 15 through nozzle 304 and ingredient dispenser assembly 1100 dispenses an ingredient, such as, for example, a fruit base to cup 15 through nozzle 304. Nozzle 304 has separate apertures for each ingredient from ingredient dispenser assembly 1100 and ice dispensed from ice storage and portion control module 300 to prevent the ice and ingredients from contacting one another in nozzle 304 and contamination therefrom.

As shown in FIGS. 15 and 15A, dispenser nozzle 304 extends through a top side of container holder portion 20 and is aligned with hole 360 and dispensing aperture 323. Cup 15 is then transferred into interior volume 230 of blender/mixer/cleaning module 303a.

Figure 16:
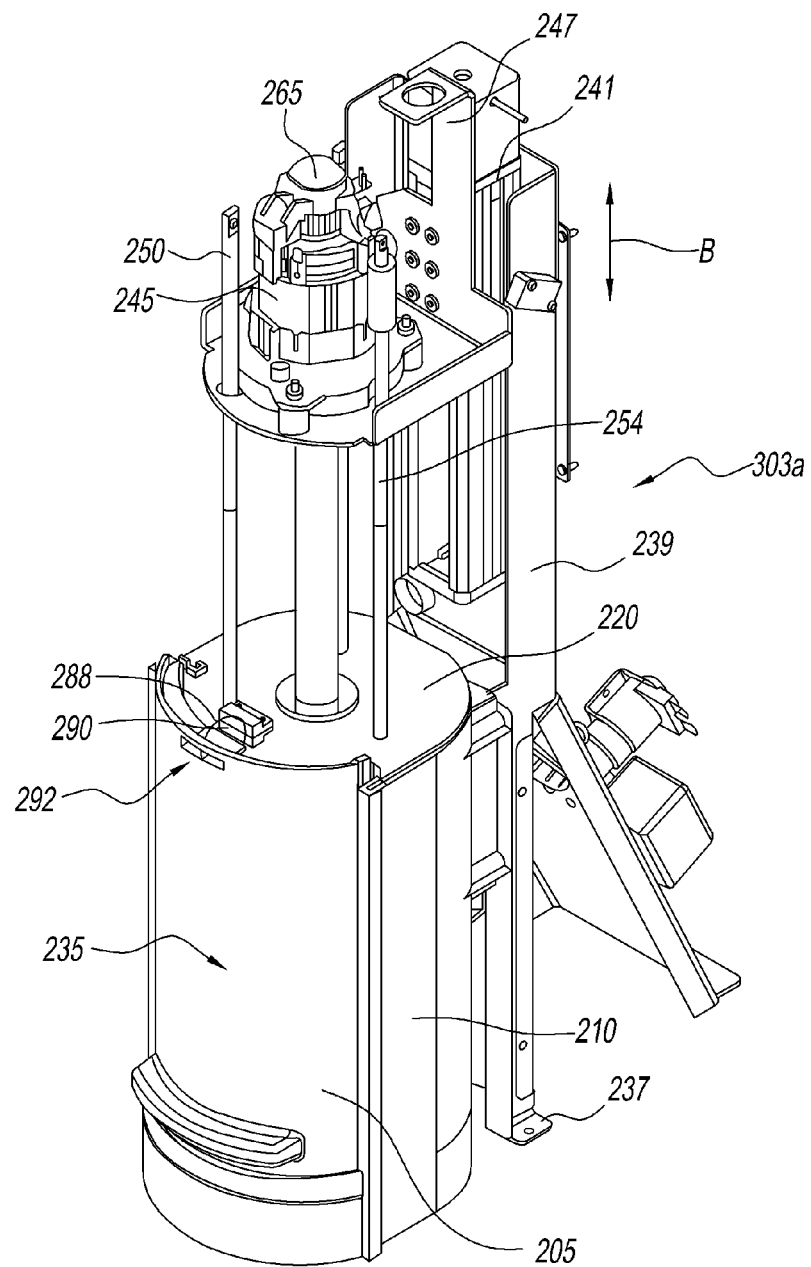
FIG. 16 is a top front right side perspective view of a blender/mixer/cleaning module according to the present disclosure.
Figure 17:
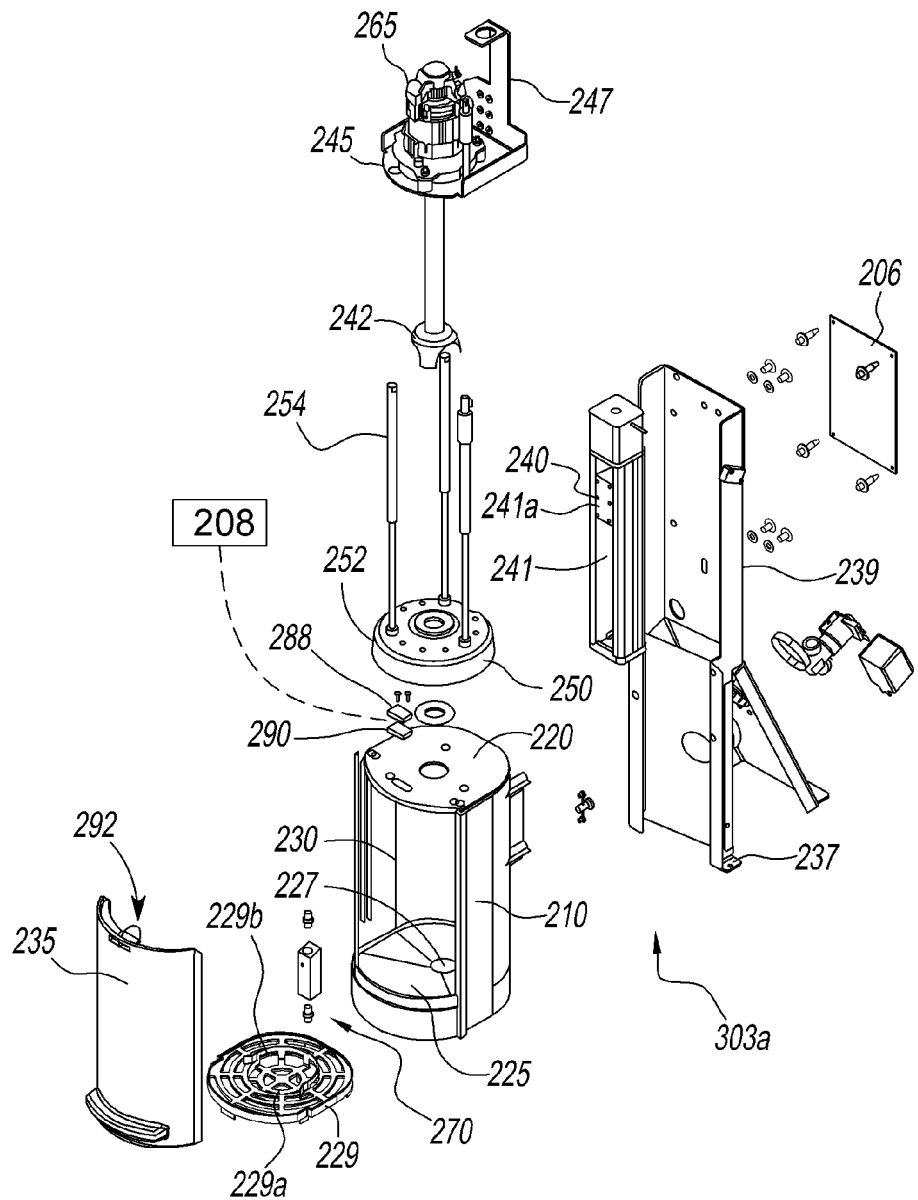
FIG. 17 is an exploded view of the blender/mixer/cleaning module of FIG. 16.
Figure 18:
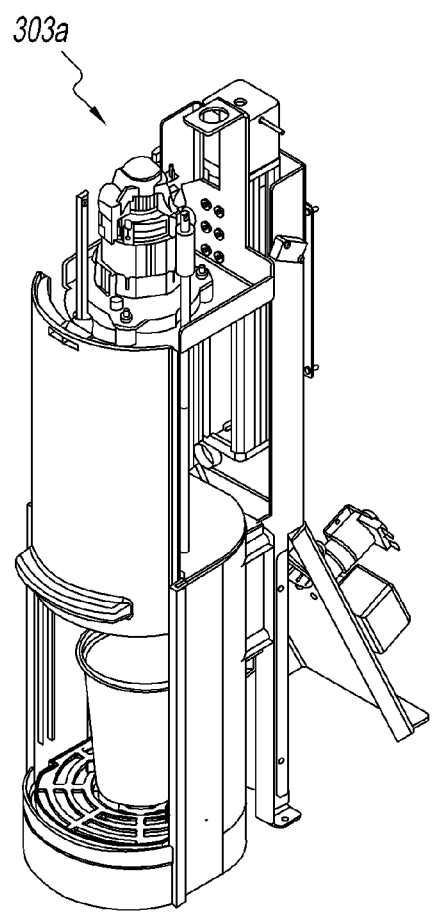
FIG. 18 is a front right side perspective view of the blender/mixer/cleaning module according to the present disclosure with a serving cup disposed therein, the blending blade in the retracted position and the door in the open position.
Figure 19:
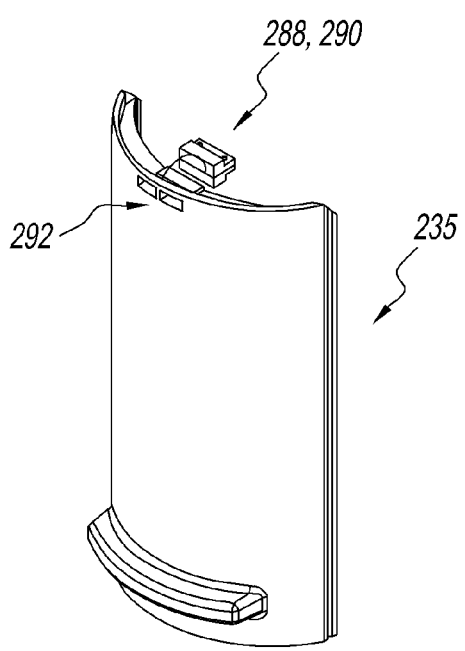
FIG. 19 is front right side perspective view of a door of the blender/mixer/cleaning module of FIG. 16.

Referring to FIGS. 16-20, blender/mixer/cleaning module 303a has a mixer housing 205. Mixer housing 205 has a side wall 210, a top wall 220, and a bottom wall 225 forming an interior volume 230 of a blender compartment. Interior volume 230 may be enclosed by a door 235 that moves to a closed position when in blending, mixing or cleaning mode, shown in FIG. 16, and an open position uncovering interior volume 230 when blender/mixer/cleaning module 303a is in a load or unload mode, as shown in FIG. 18. Optionally, door 235 may be a material that is transparent or translucent so that interior volume 230 is visible when door 235 is in the closed position. Door 235 is removable for maintenance as shown in FIG. 19. Bottom wall 225 may have a drain aperture 227. Drain aperture 227 may be covered by a cover 229.

Mixer housing 205 is optionally supported on a support structure 237. Support structure 237 has a motor support 239 that extends therefrom. Motor support 239 is connected to a motor 240. Motor 240 may be a stepper motor 241a with a linear slide 241 that is connected to motor support 239. Motor 240 is connected to a mixer/blender 245. Motor 240 may be connected to mixer/blender 245 by a bracket 247 that is moved by motor 240. Motor 240 moves spindle shaft 260 of mixer/blender 245 in a reciprocal vertical movement through top wall 220 into or out of interior volume 230.

Mixer/blender 245 may be connected to a lid assembly 250, as shown in FIG. 16. Lid assembly 250 has a lid 252 and a plurality of alignment rods 254. Lid 252 is complementary in shape to a container, for example, a cup 15 having liquid therein placed within interior volume 230. Lid assembly 250 may move with mixer/blender 245 into interior volume 230 into contact with cup 15. Lid assembly 250 remains in contact with cup 15, once lid assembly 250 is in contact with cup 15 while mixer/blender 245 may move further into interior volume 230 along a length of connection rods 254. When mixer/blender 245 is retracted toward top wall 220, mixer/blender 245 moves along the length of alignment rods 254 until an end of alignment rods 254 is reached and then lid assembly 250 moves with mixer/blender 245.

Figure 20:
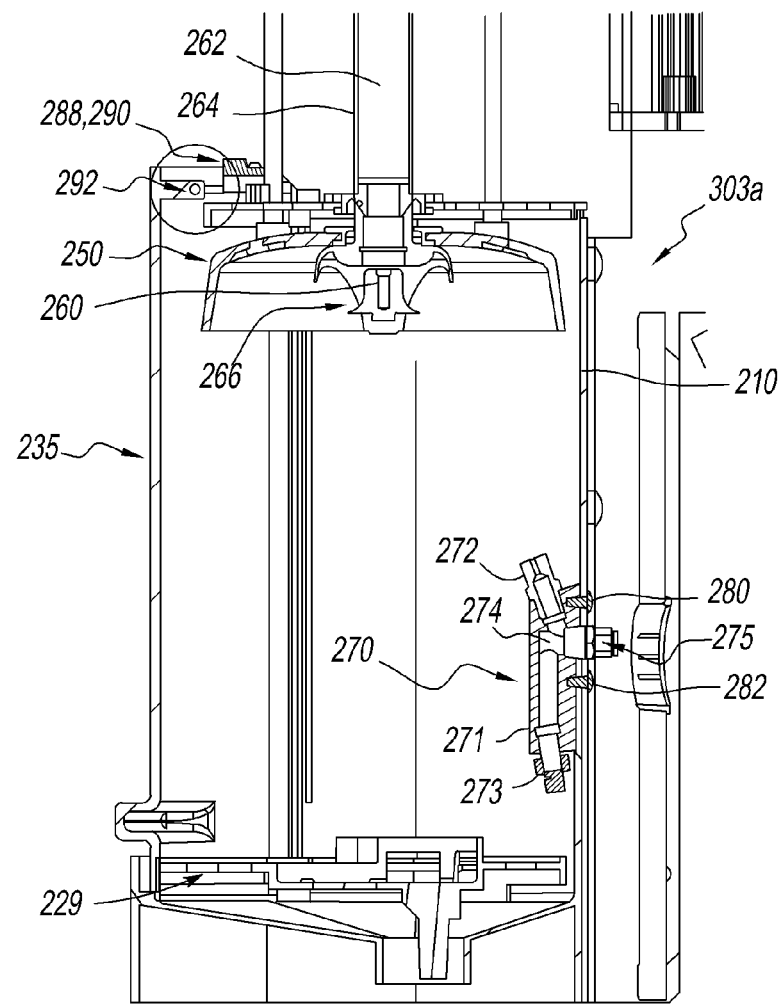
FIG. 20 is a partial side cross-sectional view of the blender/mixer/cleaning module according to the present disclosure with the blending blade in the retracted position.
Figure 21:
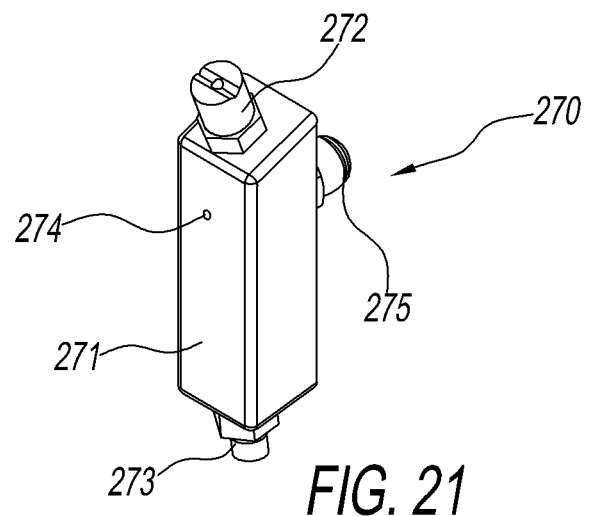
FIG. 21 is a top right side perspective view of a rinse nozzle assembly according to the present disclosure.
Figure 22:
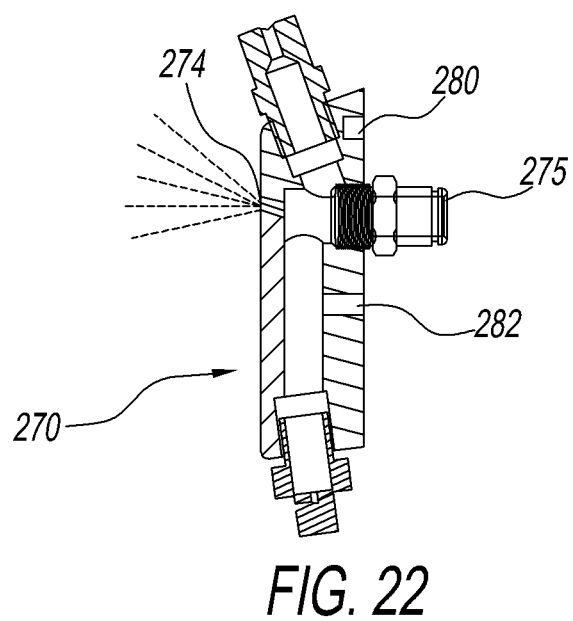
FIG. 22 is a side cross-sectional view of the rinse nozzle assembly of FIG. 21.

Mixer/blender 245 has a spindle assembly 242 having a blender blade 260, as shown in FIG. 20. Blender blade 260 has projections that facilitate mixing/blending of liquid within the cup 15. A spindle shaft 262 in a spindle shaft housing 264 connects to a mixer/blender motor 265 that spins blender blade 260 and spindle shaft 262.

Mixer/blender 245 may be attached to linear slide 241 so that linear slide 241 moves mixer/blender 245 vertically, as shown by arrow B. A controller provides a mixing/blending profile that ensures proper mixing/blending of the beverage. Linear slide 241 is driven by the stepper motor that provides precise control of movement of linear slide 241. Controller may move lid assembly 250 (blender carriage) until lid 252 touches the rim of the cup 15 before mixer/blender 245 is energized to spin blender blade 260. Splatter that results from energizing mixer/blender 245 before inserting blade 260 into the beverage is reduced and/or eliminated by moving blade 260 about 25% into the liquid within cup 15 prior to energizing mixer/blender 245 to spin blade 260. After blade 260 is energized a customizable program indexes blade 260 down into cup 15. Blade 260 may be energized with a customizable program that indexes blade 260 down into cup 15 to ensure that the nugget ice has a particle size that is reduced to beverage specifications defined by the user. Blade 260 dwells at a bottom of cup 15 for a predetermined amount of time. Blade 260 is raised and lowered for a predetermined period of time to provide complete mixing/blending of components of the beverage. After mixing/blending is complete mixer/blender 245 returns to a home position, as shown in FIGS. 16 and 20. Motor 240 and linear slide 241 may have a controller that counts a number of steps that motor travels allowing precise location of blade 260 leading to uniform beverages each time a beverage is dispensed and mixed from assembly 100.

Blender/mixer/cleaning module 303a has reed switches 288, 290 mounted on top wall 220 and a magnet 292 connected to door 235 to activate reed switches 288, 290. Reed switches 288, 290 are normally open and change state when door 235 is in the closed position.

Referring to FIG. 20, side wall 210 has a nozzle assembly 270. Nozzle assembly 270 has a nozzle manifold 271, upper rinse head 272, lower rinse head 273, a spray hole 274, and a connection 275 to attach to a water source.

Nozzle manifold 271 is connected upper rinse head 272, lower rinse head 273, a spray hole 274, and a connection 275. Nozzle manifold 271 is connected to the back of the blender compartment, for example, by two screws 280, 282. Spray hole 274 is through the front of the nozzle manifold 271 that allows water to rinse off spindle shaft housing 264.

Upper rinse head 272 is a nozzle that is angled towards a top center of the blender compartment. Upper rinse head 272 rinses blender head housing 266, blade 260, lid assembly 250 and a top portion of door 235.

Lower rinse head 273 is a nozzle that rinses a lower portion of the blender compartment and cover 229.

Nozzle assembly 270 is easy to manufacture, and does not require intricate welding and assembly. It was also found that nozzle assembly 270 can rinse the entire blender compartment. Although ingredients that are mixed during normal operation do not get above lid assembly 250, cleaning the entire blender compartment prevents any type of growth of mold or mildew due to an amount of moisture in the compartment.

Figure 23:
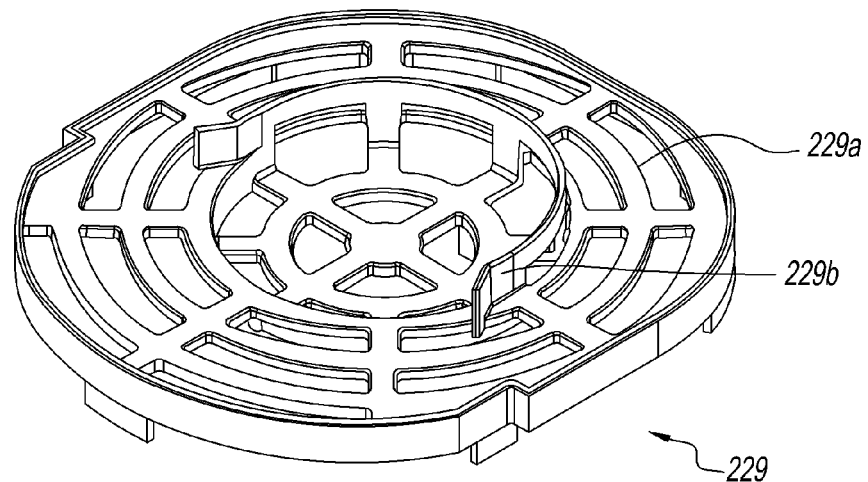
FIG. 23 is a top right side perspective view of a cover according to the present disclosure.

Referring to FIGS. 17 and 23, cover 229 has apertures 229a and a ridge 229b. Apertures 229a allows fluid to pass through cover 229 to drain aperture 227. Ridge 229b holds cup 15 in position during mixing by mixer/blender 245. Ridge 229b may be shaped complimentary to the shape of cup 15, for example, a U-shape.

After cup 15 is removed from interior volume 230, door 235 may be moved to a closed position so that interior volume 230 and/or mixer/blender 245 may be rinsed/cleaned and/or sanitized. A water solenoid and/or air solenoid are energized. Mixer/blender 245 is energized spinning blade 260 and lowered into interior volume 230 by stepper motor 241a and linear slide 241. Blade 260 is indexed up and down causing rinse liquid to spray entire interior volume 230 or mix compartment. Mixer/blender 245 is de-energized stopping blade 260 from spinning and returns to the home location. Air can continue and be used to help in removal of water residue. Another cup having another beverage therein may be mixed by mixer/blender 245.

Mixer/blender 245 and interior volume 230 may be rinsed with water only after mixing each beverage, mixer/blender 245 and interior volume 230 may be rinsed with water and/or sanitized with a sanitizing liquid, such as, for example, soap or detergent, after mixing each beverage, or mixer/blender 245 and interior volume 230 may be rinsed with water only after mixing each beverage and periodically mixer/blender 245 and interior volume 230 are sanitized.

Referring to FIG. 15A, in use, cup 15 is placed on container holder portion 20 of assembly 100. Ice maker, ice storage and portion control module 300 dispenses ice to cup 15 through nozzle 304 and ingredient dispenser assembly 1100 dispenses an ingredient, such as, for example, a fruit base to cup 15 through nozzle 304. Cup 15 is then transferred into interior volume 230 of blender/mixer/cleaning module 303a. Door 235 is moved to the closed position and mixer/blender 245 mixes the ice and fruit base. Upon completion of the mixing, door 235 is moved to the opened position and cup 15 is removed and delivered to the consumer. Door 235 is then closed and interior volume 230 is rinsed and/or sanitized.

Each beverage may be mixed in a single serving cup 15 that is served directly to a consumer, allowing the entire beverage to be delivered to the consumer raising product yield and reducing wasted beverage, e.g., when blending the beverage in a blender pot. Having each beverage blended in its own cup improves flavor control and reduces allergy issues caused through cross-contamination.

Referring to FIG. 17, a controller 206, which, for example, may be disposed on a printed circuit board, controls blender/mixer/cleaning module 303a. Interlocks in the form of reed switches and magnets are used on each door of the blender compartments for safety and control. One of reed switches 290 is connected to controller 206 using a software logic for safety and blender operation. From a safety aspect one of switches 290 prevents any operation of mixer/blender 245 if door 235 is not in the closed position or removed by one of switches 290 outputting a signal to controller 206 that magnet 292 is not detected by one of switches 290 and controller 206 stopping operation of mixer/blender 245. Also if door 235 is moved from the closed position or removed while blender/mixer/cleaning module 303a is blending or rinsing one of switches 290 outputs a signal to controller 206 that magnet 292 is not detected by one of switches 290 and controller 206 disables mixer/blender motor 265 and returns mixer/blender 245 returns to its home position. This prevents access to the any moving parts on the blender for safety.

The other one of reed switches 288 is connected to a relay 208 external from controller 206 that disconnects power to mixer/blender motor 265 if door 235 is not in the closed position or removed by the other one of switches 288 outputting a signal to relay 208 that magnet 292 is not detected by the other one of switches 288. Reed switches 288, 290 are redundant to remove power to mixer/blender motor 265 in event there is a failure on controller 206 caused either by a hardware and/or software malfunction.

Reed switches 288, 290 are advantageous over a micro switch because reed switches 288, 290 are less expensive than the micro switch. Reed switches 288, 290 are rated for a much higher number of cycles. Micro switches tend to be rated for a few hundred thousand cycles while a reed switch will generally be rated in the millions. Reed switches 288, 290 depending on the magnet used has a wider operating range that it can sense and is not dependent on physical contact to operate. For example, if magnet 292 passes within 0.75 of an inch from reed switches 288, 290 will activate. This allows door 235 to move slightly and vibrate during operation preventing nuisance trips. Also with no physical contact there is practically no chance of reed switches 288, 290 and magnet 292 being damaged by the end user.

Controller 206 is a printed circuit board that carries blender/mixer controllers for blending, mixing and cleaning activities of blending/mixing/cleaning module 303a and will house controllers comprising motor 240, linear slides 241, mixer/blender motor 265, and water solenoids. Operation of motor 240, linear slides 241, mixer/blender motor 265, and water solenoids is affected if door 235 is moved from the close position. During operation of motor 240, linear slides 241, mixer/blender motor 265, and/or water solenoids if door 235 is moved from the close position operation of motor 240, linear slides 241, mixer/blender motor 265, and/or water solenoids is stopped, and, for example, mixer/blender 245 returns to the home position. Once door 235 is in the close position, motor 240, linear slides 241, mixer/blender motor 265, and/or water solenoids being operated are activated again, for example, from the start of a predetermined blend/clean cycle. The predetermined blend/clean cycle includes predetermined times of operation, speed of operation, and position in cup 15 of motor 240, linear slides 241, mixer/blender motor 265, and/or water solenoids. Controller 206 may allow the blend cycle to resume from the point in which door 235 was moved from the close position upon door returning to the closed position. During a rinse cycle when water solenoids are operated to provide water to nozzle assembly 270, if the door is moved from the close position, mixer/blender 245 returns to the home position and all water solenoids are closed to prevent the flow of water. Once door 235 is moved to the close position water solenoids are opened so that the rinse begins again from the start of its cycle.

Figure 24:
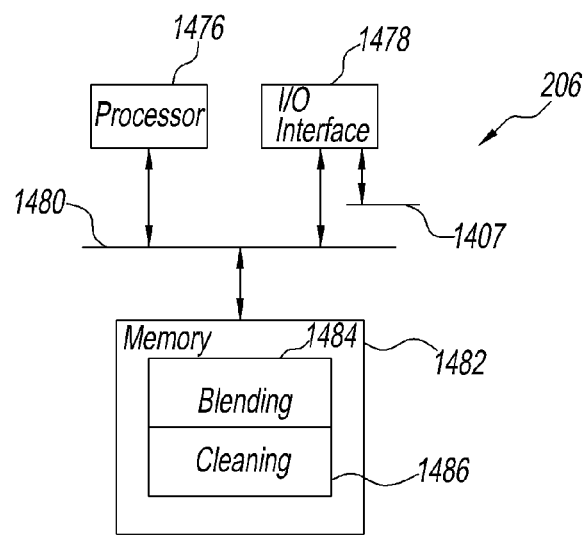
FIG. 24 is a block diagram of a controller of blender/mixer/cleaning module according to the present disclosure.

Referring to FIG. 24, controller 206 comprises a processor 1476, an input/output (I/O) interface 1478 and a memory 1482 interconnected via a bus 1480. I/O interface 1478 includes connections to blender module 303a. Memory 1482 comprises a blend/clean cycle program 1484 for control of blender module 303a and various other programs, such as, an operating system, utility programs and other programs. Processor 1476 is operable to execute blend/clean cycle program 1484, and the other programs as well. Other blender controllers 206 in assembly 100 include an architecture identical to blender controller 206 for control of associated blending/mixing/cleaning modules 303.

Figure 25:
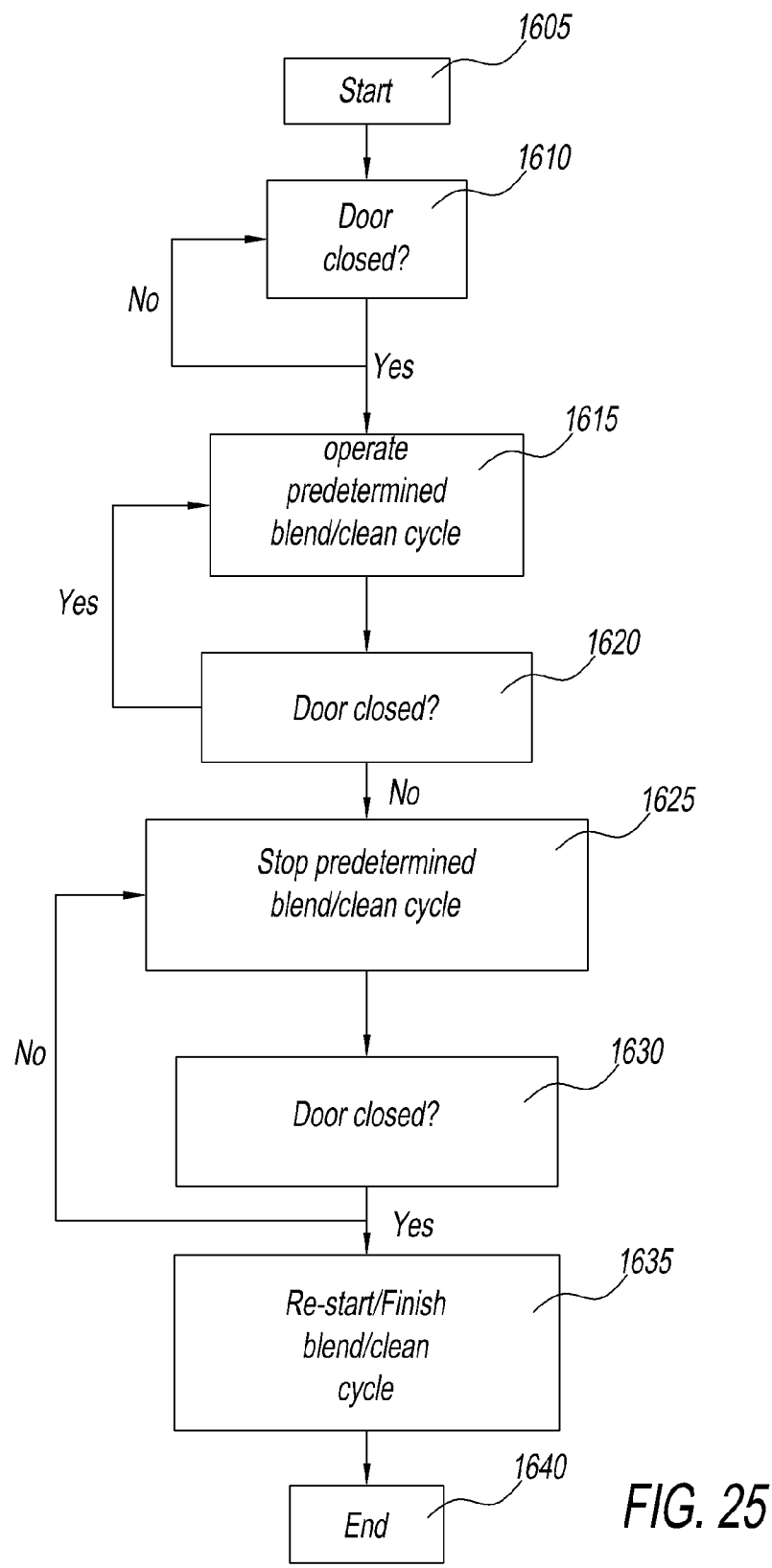
FIG. 25 is a flow diagram of the program of the controller of FIG. 24.

Referring to FIG. 25, a blend/clean cycle program 1484 is stored in memory 1482 and executed by processor 1476 of controller 206 (FIG. 24). At step 1605, blend/clean cycle program 1484 starts. At step 1610, it is determined if door 235 is closed. If no, step 1610 is repeated. If yes, blend/clean cycle program 1484 proceeds to step 1615. At step 1615, the predetermined blend/clean cycle operates. At step 1620 it is determined if door 235 is closed. If yes, steps 1615 is repeated and the predetermined blend/clean cycle operates. If no, blend/clean cycle program 1484 proceeds to step 1625. At step 1625, the predetermined blend/clean cycle stops. At step 1630 it is determined if door 235 is closed. If yes, the predetermined blend/clean cycle starts from the beginning or resumes where stopped at step 1625 and blend/clean cycle program 1484 ends. If no, steps 1625 and 1630 are repeated.

Each beverage may be mixed in a single serving cup 15 that is served directly to a consumer, allowing the entire beverage to be delivered to the consumer raising product yield and reducing wasted beverage, e.g., when blending the beverage in a blender pot. Having each beverage blended in its own cup improves flavor control and reduces allergy issues caused through cross-contamination.

Advantageously, ice storage and portion control module 300 generates ice through a fully integrated on-board ice system. Ice storage and portion control module 300 may, for example, have a 30-pound ice storage system that has the capability to create an additional 18 pounds of ice each hour, with a peak total of 450 pounds per day. Having ice generation on board removes the risk of injury through slips and falls, and it decreases the chance of bacterial contamination through mishandling. Additionally, the ice used in ice maker 305b may be nugget-style ice, which is easier to fracture and blend down into the smoothie consistency. All of this allows for a perfectly blended beverage, for example, smoothie that fits within a normal QSR delivery time.

Each beverage, for example, smoothie is blended in its own cup, allowing the entire beverage or drink to be delivered to the customer and, in turn, raising product yield. Having each drink blended in its own cup improves flavor control and reduces allergy issues caused through cross-contamination. Assembly may, for example, consistently provide twenty 36-ounce drinks per hour and, at peak capabilities, 60 16-ounce drinks for one-hour bursts. Money is also saved through the elimination of small wares or blender pots that were purchased and stored by restaurant owners in the past. Blender pots that are currently used are made of hard plastic, with the ability to withstand the forces used to crush ice into an acceptable consistency for a smoothie drink. Grinding the cube-style ice, most commonly found in QSRs, would put too much stress on the machine's blender and the customer's cup in contrast to flake or nugget ice.

Additionally, nugget ice is softer than the more commonly known cube ice, and it is formed in a freeze barrel with an internal auger that continually scrapes the freeze surface. This flake-style ice is moved to the top of the freeze barrel by the ice auger, where it is extruded into the ice nugget. The resulting smaller ice greatly reduces the amount of blending required to create the drink. Additionally, the noise generated from the blending process is reduced by using this smaller nugget ice. This becomes especially important when the equipment is placed in the proximity of the front counter or near a drive-through window.

It has been found by the present inventors that size limitations (footprint) may be achieved by a configuration of the components of ice storage and portion control module 300 that includes ice maker 305b.

Ice storage and portion control module 300 maintains ice dispense accuracy. The ice dispense is divided into portion cups. As the drink size changes, the number of portion control cups 302 dropping ice into the beverage increases or decreases to match. To measure the number of ice dispenses, sensor 306 and controller (located outside of the ice bin) are incorporated to count the number of cups. This method provides consistent ice delivery regardless of the level of ice in ice bin 305a.

Ice storage and portion control module 300 may have ice maker 305b with capability to store 9 kilograms of ice in addition to ice making capabilities. Ice maker 305b may generate hard nugget ice. Ice maker 305b may have the capability to generate a minimum of 240 pounds of ice per day. Ice maker 305b may operate on 120 volts 60 hertz +/−10%. Ice maker 305b may have provisions for 220 50 Hertz operation for Europe +/−10%.

The ice may be dispensed by ice storage and portion control module 300 during a smoothie making process or dispensed exclusively (i.e. without flavors or water). The ice may be dispensed by ice storage and portion control module 300 in a portion amount that allows scaling for various drink cup sizes. The ice amount may be dispensed by ice storage and portion control module 300 with an accuracy of ±10%. Ice storage and portion control module 300 may be incorporated with a system that provides a button for ice only dispensing. Upon selection of the ice-only button, the system may proceed to cup size selection. The ice-only button may only be available when no flavors are selected. Conversely, upon selection of a flavor the ice-only button may be disabled.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An ice portion control module comprising:
   an ice bin for storing ice;
   a base in said ice bin having:
   a plurality of portion control compartments, each of said plurality of portion control compartments having an interior volume to hold a predetermined portion of said ice and a sidewall connected to a first plate; and
   a plurality of magnets, each magnet associated with one of said plurality of portion control compartments and disposed in an opening in said first plate; and
   an actuator which moves said plurality of portion control compartments between a fill position wherein said plurality of portion control compartments holds said ice, and a dispense position wherein said predetermined portion of said ice is dispensed out of one of said plurality of portion control compartments, wherein each of said magnets moves as its associated portion control compartment is moved by said actuator; and
   a sensor disposed outside of said ice bin that detects the movement of said plurality of magnets.

2. The ice portion control module of claim 1, wherein said sidewall connects to said first plate on a first side and a third plate on a second opposite side, and wherein each of said plurality of magnets in said opening has a magnet cover that connects to said third plate.

3. The ice portion control module of claim 2, wherein said first plate, said side wall, and said third plate are machined from one piece of material to form a combination plate, and wherein said combination plate has each of said plurality of said magnets inserted and held in place with a cap that is pressed in place.

4. The ice portion control module of claim 1, wherein said stationary sensor communicates an output indicative of each of said plurality of magnets as it passes by said sensor to a portion control controller that counts the number of said plurality of portion control compartments that is moved over a dispensing aperture in said ice bin based on said outputs from said sensor, and wherein said portion control controller activates and deactivates a drive assembly of said actuator based upon said outputs of said sensor to move a predetermined number of said plurality of portion control compartments over said dispensing aperture.

5. The ice portion control module of claim 4, wherein said portion control controller deactivates said drive assembly when said sensor does not detect one of said plurality of magnets so that one of said plurality of portion control compartments is not partially disposed over said dispensing aperture.

6. The ice portion control module of claim 1, further comprising an agitator having a spiral shape that rotates in said ice bin.

7. The ice portion control module of claim 6, wherein said agitator rotates with said plurality of portion control compartments.

8. The ice portion control module of claim 6, wherein said agitator and said plurality of portion control compartments move separately.

* * * * *